United States Patent
Kakutani et al.

(10) Patent No.: US 6,173,801 B1
(45) Date of Patent: Jan. 16, 2001

(54) MANUALLY OPERATED TRAVELLING VEHICLE WITH AUXILIARY POWER

(75) Inventors: Kazushige Kakutani; Hideaki Aoki; Hideo Kawakami; Yoshio Tomigashi, all of Moriguchi (JP)

(73) Assignee: Sanyo Electric Co., Ltd., Osaka (JP)

( * ) Notice: Under 35 U.S.C. 154(b), the term of this patent shall be extended for 0 days.

(21) Appl. No.: 09/147,156

(22) PCT Filed: Oct. 22, 1997

(86) PCT No.: PCT/JP97/03818

§ 371 Date: Oct. 20, 1998

§ 102(e) Date: Oct. 20, 1998

(87) PCT Pub. No.: WO98/19144

PCT Pub. Date: May 7, 1998

(30) Foreign Application Priority Data

Oct. 25, 1996 (JP) .................................................. 8-283802
Nov. 25, 1996 (JP) .................................................. 8-313930
Feb. 20, 1997 (JP) .................................................. 9-036150
Oct. 17, 1997 (JP) .................................................. 9-285633

(51) Int. Cl.$^7$ .................................................. B62K 11/00
(52) U.S. Cl. ........................ 180/220; 180/206; 280/259; 73/862.333
(58) Field of Search .................................. 180/205, 206, 180/220, 65.1; 73/862.325, 862.331, 862.333, 862.334; 280/259, 260; 74/594.2, 594.1

(56) References Cited

U.S. PATENT DOCUMENTS

| | | | |
|---|---|---|---|
| 5,226,501 | * 7/1993 | Takata | 180/206 |
| 5,287,059 | * 2/1994 | Ando et al. | 324/253 |
| 5,341,892 | * 8/1994 | Hirose et al. | 180/220 |
| 5,603,388 | * 2/1997 | Yaguchi | 180/206 |
| 5,801,644 | * 9/1998 | Ruthroff | 340/870.31 |
| 5,816,599 | * 10/1998 | Soejima et al. | 280/259 |
| 5,857,537 | * 1/1999 | Matsumoto et al. | 180/206 |

FOREIGN PATENT DOCUMENTS

| | | |
|---|---|---|
| 54-3591 | 1/1979 | (JP) . |
| 1-105834 | 7/1989 | (JP) . |
| 3-5900 | 1/1991 | (JP) . |
| 4-100790 | 4/1992 | (JP) . |
| 7-229802 | 8/1995 | (JP) . |
| 7-267174 | 10/1995 | (JP) . |
| 7-309284 | 11/1995 | (JP) . |
| 8-26171 | 1/1996 | (JP) . |
| 8-26172 | 1/1996 | (JP) . |
| 8-26173 | 1/1996 | (JP) . |
| 8-53094 | 2/1996 | (JP) . |
| 8-230755 | 9/1996 | (JP) . |

OTHER PUBLICATIONS

*Fundamentals and Applications of Servo Motors*, published on Sep. 15, 1989, pp. 104–107 and 118, with English translation.

* cited by examiner

Primary Examiner—Brian L. Johnson
Assistant Examiner—Avraham H. Lerner
(74) Attorney, Agent, or Firm—Arent Fox Kintner Plotkin & Kahn, PLLC

(57) ABSTRACT

A manually operated travelling vehicle with an auxiliary power device, which can detect a rotating torque applied to a rotating crank shaft (40) in non-contact manner. Supported on a body (15) is a manually operated prime mover wheel (5). A rotating coil (201) is provided coaxially on the prime mover wheel (5). A variable impedance device (202) is electrically connected to the rotating coil (201) such that impedance changes depending upon a load applied to the prime mover wheel (5). A stationary coil (101) is fixed to the body (15) to be coaxial with and spaced from the rotating coil (201) with a predetermined interval therebetween and is electromagnetically connected to the rotating coil (201). A detection circuit (109) is connected to the stationary coil (101) to detect a change in current or voltage applied to the stationary coil (101) from the rotating coil (201) in accordance with an impedance change in the variable impedance device (202). A control unit (130) controls a power source for the auxiliary power device on the basis of an output value issued from the detection circuit (109).

12 Claims, 18 Drawing Sheets

MANUALLY OPERATED TRAVELLING VEHICLE WITH AUXILIARY POWER

TECHNICAL FIELD

The present invention relates to manpowered vehicles such as bicycles that are provided with auxiliary power apparatuses for supplementing manpower in accordance with the load on the manpower.

BACKGROUND ART

A known auxiliary powered bicycle has a drive wheel to which a motor is connected. When the bicycle is driven by manpower, the motor is driven in accordance with the load applied to the pedal. This produces auxiliary power that supplements the manpower. Thus, the bicycle can be driven with a low degree of manpower.

Japanese Unexamined Patent Publication No. 4-100790 describes an example of how to measure the drive force applied by man. A torsion bar is used as a pedal crank axle. A detector such as a potentiometer or a strain gauge is arranged on the torsion bar to detect the twisted amount of the torsion bar and thus measure the applied torque.

However, the potentiometer or the strain gauge is arranged on a rotated axle. Thus, signals representing the detected value must be output using a slip ring or a brush. As a result, there is a tendency for noise to be included in the signals due to friction and abrasion. This makes it difficult to detect torque accurately.

In addition, the employment of a slip ring or a brush produces aural noise caused by friction as the bicycle moves. Such noise may make the rider feel uncomfortable.

Furthermore, the slip ring and the brush must be replaced when abrasion occurs. Such replacement is burdensome.

Accordingly, it is an objective of the present invention to provide an auxiliary powered manpowered vehicle having a torque detector that detects the torque applied to a rotated crank axle in a non-contact manner in order to prevent the production of noise caused by friction or abrasion and detect torque accurately.

It is a another objective of the present invention to provide an auxiliary powered manpowered vehicle that prevents the production of aural noise due to friction when the bicycle travels and thus does not make the rider feel uncomfortable.

It is also an objective of the present invention to provide an auxiliary powered manpowered vehicle that prevents abrasion between parts and thus eliminates the necessity for the replacement of such parts.

It is a further objective of the present invention to provide an auxiliary powered manpowered vehicle that detects a load acting along the rotating direction of a crank axle and a drive gear within the same plane and thus uses restricted space in an effective manner.

DISCLOSURE OF THE INVENTION

The auxiliary powered manpowered vehicle according to the present invention is a man powered vehicle, which includes an auxiliary power apparatus having a power source for supplementing the driving of the manpowered vehicle. The manpowered vehicle includes a main body, a rotated body supported by the main body and driven by manpower, a rotary coil arranged coaxially with the rotated body, a variable impedance device electrically connected to the rotary coil and having impedance varied in accordance with the load applied to the rotated body, a fixed coil fixed to the main body such that the fixed coil is concentric with and spaced by a predetermined distance from the rotary coil and is electromagnetically coupled with the rotary coil, a detecting circuit connected with the fixed coil and detecting changes in electric current or voltage of the fixed coil caused by the rotary coil in accordance with the impedance varied by the variable impedance device, and a controller for controlling the power source based on the output value of the detecting circuit.

In such structure, the application of load to the rotated body varies the impedance of the variable impedance device, which is arranged in the rotary coil. The varied impedance is transmitted to the fixed coil by electromagnetic coupling between the rotary coil and the fixed coil. This varies the electric current or the voltage of the fixed coil. The change in the electric current or voltage is detected by a detecting device. The power source of the auxiliary power device is driven in accordance with the detected value.

In the present invention, the load applied to the rotated body varies the impedance of the variable impedance device, which rotates integrally with the rotated body. The variation is transmitted to the detecting circuit by way of the electromagnetic coupling between the rotary coil and the fixed coil. Therefore, a slip ring is not necessary for extracting torque signals and the production of noise resulting from friction or abrasion is prevented. Accordingly, the torque applied to the rotated body is measured accurately. Furthermore, noise produced by friction during the movement of the vehicle is eliminated. Thus, the operator does not feel discomfort that would result from such friction noise. Additionally, there is no abrasion of parts. Therefore, replacement of parts is not necessary. This enhances reliability and durability.

The manpowered vehicle according to the present invention further provides a support plate movable along the axial direction of the rotated body with the fixed coil being arranged on the support plate, a spacer arranged between the support plate and the rotated body to maintain the distance between the two coils, and an urging member for affecting the support plate such that the spacer maintains the distance. With this structure, the distance between the fixed coil and the rotary coil is maintained by the spacer. Accordingly, the distance between the fixed coil and the rotary coil is maintained even when swaying or vibrating occurs. This improves the reliability and accuracy of the measured torque signal.

It is preferable that the spacer includes a ball bearing having a pair of races, and a plurality of balls held between the races. With this structure, the fixed coil and the rotary coil are rotated relatively by the ball bearing.

The expansion and contraction of the urging member and the existence of the spacer maintains a constant distance between the fixed coil and the rotary coil even if the length of the axle projecting from the main body differs due to application to a vehicle having dimensional differences resulting from production or application to a different type of vehicle. Thus, the two coils may be designed to have a constant distance therebetween for each vehicle type. In addition, fine adjustment of the distance between the coils is not necessary.

The arrangement of the ball bearing between the support plate, on which the fixed coil is located, and the rotated body, on which the rotary coil is located, maintains smooth rotation even if the urging member urges the support plate toward the rotated body.

It is preferable that the auxiliary power apparatus includes a power source circuit for supplying electric power in a cyclic manner to the fixed coil. In this case, the cyclic electric power supplied to the fixed coil by the power source circuit and electromagnetic induction between the fixed coil and the rotary coil generates induced electromotive force in the rotary coil. Furthermore, mutual induction affected by impedance, which is varied by the variable impedance device, acts on the fixed coil.

In an embodiment according to the present invention, the rotated body includes a crank axle pivotally supported by the main body and a drive gear rotatably coupled to the periphery of the crank axle. A crank arm has a basal end fixed to the crank axle and a distal end on which a pedal is arranged to rotate the crank arm integrally with the crank axle. The drive gear is connected to a manpowered drive wheel. The crank axle and the drive gear are connected by an elastic body to rotate integrally with each other. With this structure, rotation of the pedal is transmitted to the drive gear by way of the elastic body, and the load acting on the drive wheel relatively displaces the positional relationship between the crank axle and the drive gear in the rotating direction against the elasticity of the elastic body.

In this case, the drive gear does not move in the axial direction of the crank axle. This eliminates the need for space in the axial direction and thus enables the torque detector to have a thin structure.

Additionally, the variable impedance device includes an element for varying the impedance in accordance with the amount of relative displacement between the crank axle and the drive gear.

The variable impedance device preferably includes a core made of a magnetostrictive material and a coil arranged on one part of an outer surface of the core. The remaining part of the outer surface of the core is supported between the crank axle and the drive gear. With this structure, the impedance of the coil is varied by deformation of the core that corresponds to the load acting on the drive gear.

In a further embodiment, the crank arm, which is fixed to the crank axle, includes a pressing piece that projects toward the drive gear, and the drive gear includes a receiving piece facing the pressing piece along the direction of rotation. The core is arranged between the pressing piece and the receiving piece. In such a structure, the core is arranged in the space formed between the crank arm and the drive gear. In this case, the arrangement of the core between the crank arm and the drive gear eliminates the need of a separate space for the accommodation of the core. Furthermore, the core is surrounded by the drive gear and the crank arm and thus protected. This prevents the core from being damaged.

It is preferable that a container accommodate the core and the coil, and that the container be made of a magnetic body. In such a structure, the container forms a magnetic circuit about the coil and thus eliminates leakage flux from portions encompassed by the container. Preferably, the container has a cup-like shape.

It is preferable that a pressing surface of the pressing piece or a receiving surface of the receiving piece is connected to the core by an elastic plate. In such a structure, the pressing surface of the pressing piece or the receiving surface of the receiving piece may be inclined with respect to the end surface of the core.

Either the pressing surface of the pressing piece or the receiving surface of the receiving piece may be round, and a plate member and an elastic plate may be used to connect the round surface to one end surface of the core. In such structure, the round pressing surface of either the pressing piece or the receiving piece abuts the plate member at a single point. This applies force on the end surface of the core in a uniform manner by means of the elastic member. More specifically, the plate member employs a magnetic body. This forms a magnetic circuit, together with the container, about the coil. Thus, in addition to the portions encompassed by the container, leakage flux is eliminated from the portions encompassed by the plate member.

The detecting circuit employed in the present invention measures the electric current flowing through the fixed coil or the coil voltage. In a preferred embodiment, the auxiliary power apparatus includes an oscillator circuit that varies the oscillating frequency in accordance with the impedance varied by the variable impedance device. With this structure, variation of the impedance of the variable impedance device varies the inductance of the fixed coil entirely. This varies the oscillating frequency of the oscillator circuit. In this case, the various circuits of the rotary coil need not be supplied with electric power. This simplifies the circuit structure.

In a further embodiment, the auxiliary power apparatus includes an oscillator circuit that varies the oscillating frequency based on the impedance varied by the variable impedance device. The oscillator circuit is connected to the rotary coil. With this structure, variation of the impedance of the variable impedance device varies the oscillating frequency of the oscillator circuit. The varied oscillating frequency is transmitted to the circuit of the fixed coil by electromagnetic coupling between the rotary coil and the fixed coil. In this case, the rotary coil circuit is actuated using the induced electromotive force generated by the rotary coil as an electric power source.

In another embodiment of the present invention, changes in the torque applied to the crank axle are detected based on fluctuations of the oscillating frequency. Mechanical differences related to the installation of the rotary coil are irrelevant to changes in the torque. Accordingly, torque is detected with high reliability.

BEST MODE FOR CARRYING OUT THE INVENTION

Figure 1:
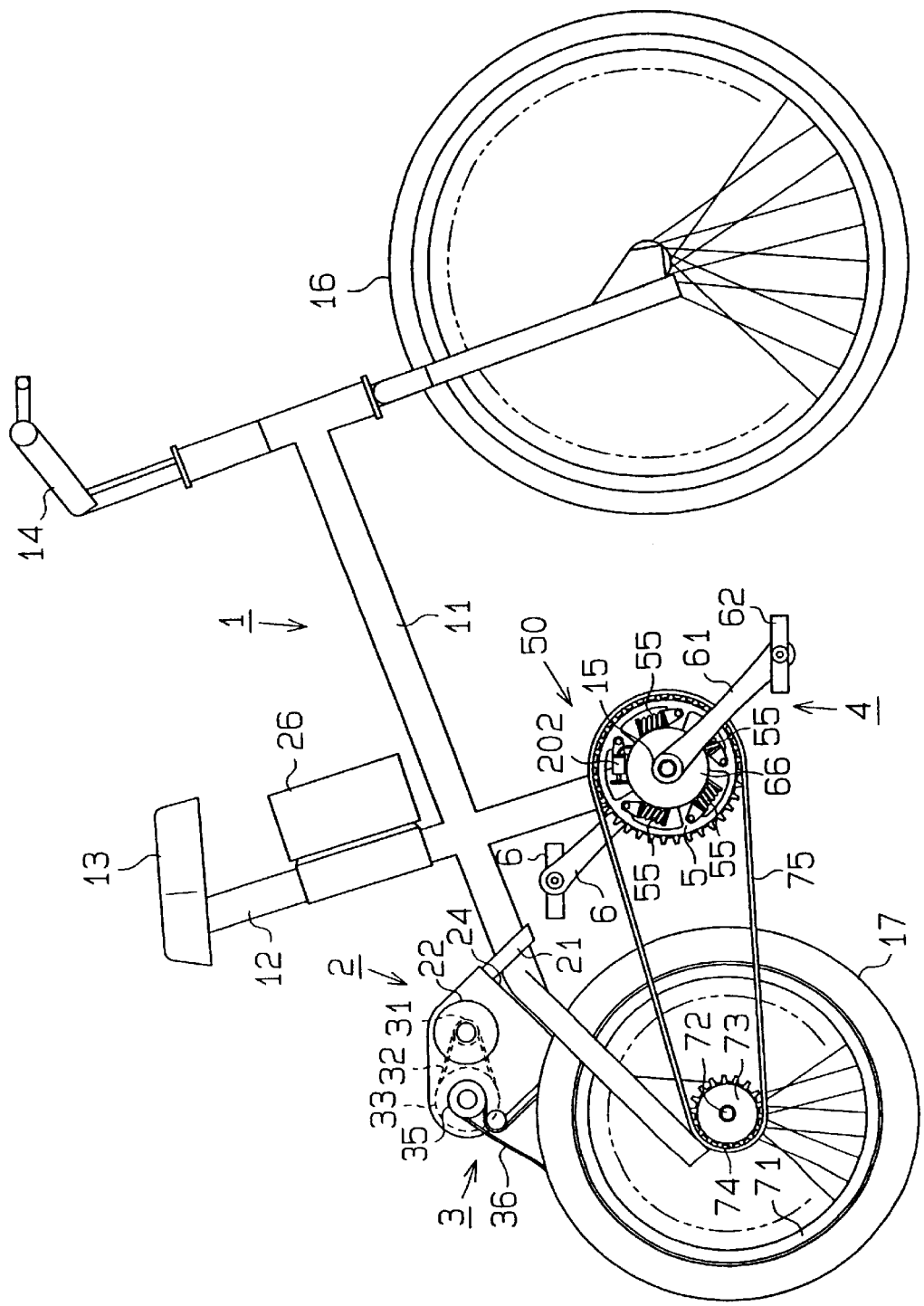
FIG. 1 is a side view showing the entire structure of an auxiliary powered manpowered vehicle according to a first embodiment of the present invention.

Embodiments according to the present invention will now be described with reference to the drawings.

The present invention is embodied in a two-wheel bicycle having a rear wheel 17, which serves as a drive wheel. When turning pedals 62, the direction in which the bicycle 1 advances is referred to as frontward, the direction in which rotating parts rotates is referred to as forward, and the leftward and rightward directions are determined with respect to the advancing direction of the bicycle 1.

The entire structure of the bicycle 1 will first be described. Afterward, first to fourth embodiments, which are related to a torque detector 50, fifth and sixth embodiments, which are related to the installation of a core 90, and a seventh embodiment, which is related to the installation of a rotary coil 201 and a fixed coil 101, will be described.

As shown in FIG. 1, the bicycle 1 has a front wheel 16 located at a front portion of a frame 11. The rear wheel 17, which serves as the drive wheel, is located at the rear portion of the frame 11.

Figure 2:
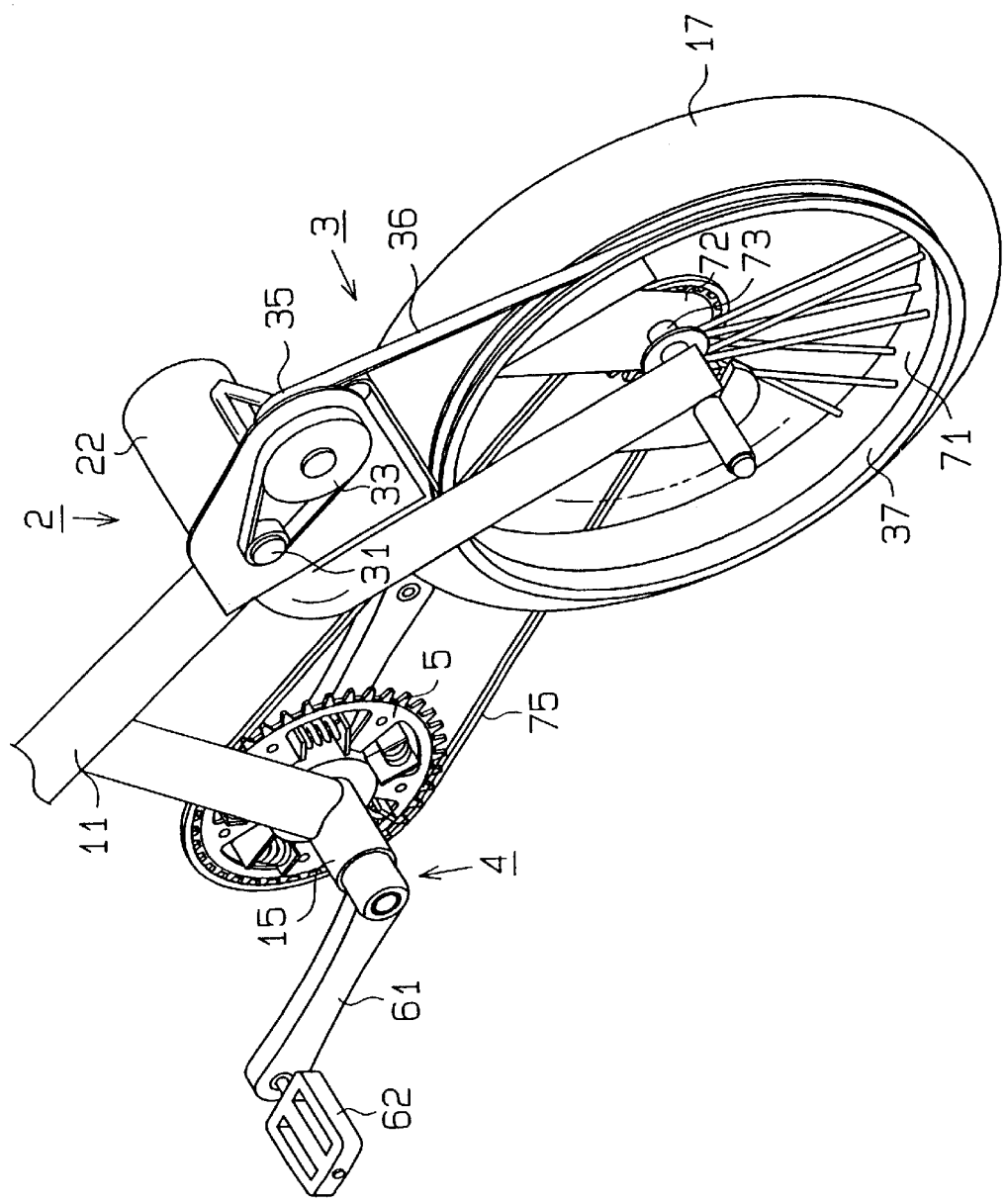
FIG. 2 is a rear left perspective view of the auxiliary powered manpowered vehicle of FIG. 1.

A seat tube 12 is located at the middle portion of the frame 11. A saddle 13 is mounted on a top end of the seat tube 12. A bottom bracket 15 is provided at a bottom end of the seat tube 12 to pivotally support a pedalling mechanism 4, as shown in FIG. 2.

Figure 4:
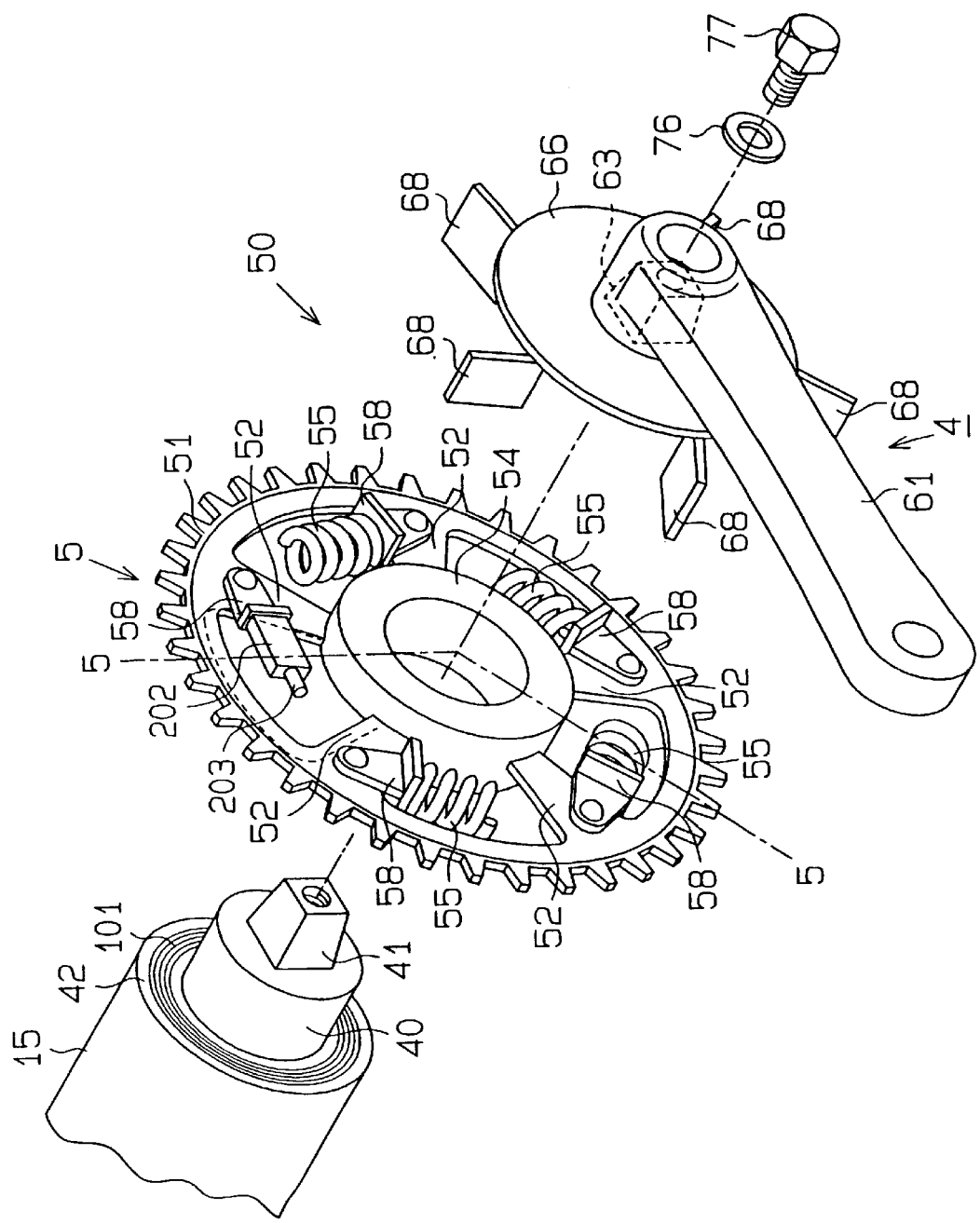
FIG. 4 is an exploded perspective view showing the structure of a pedalling mechanism employed in the first embodiment.
Figure 5:
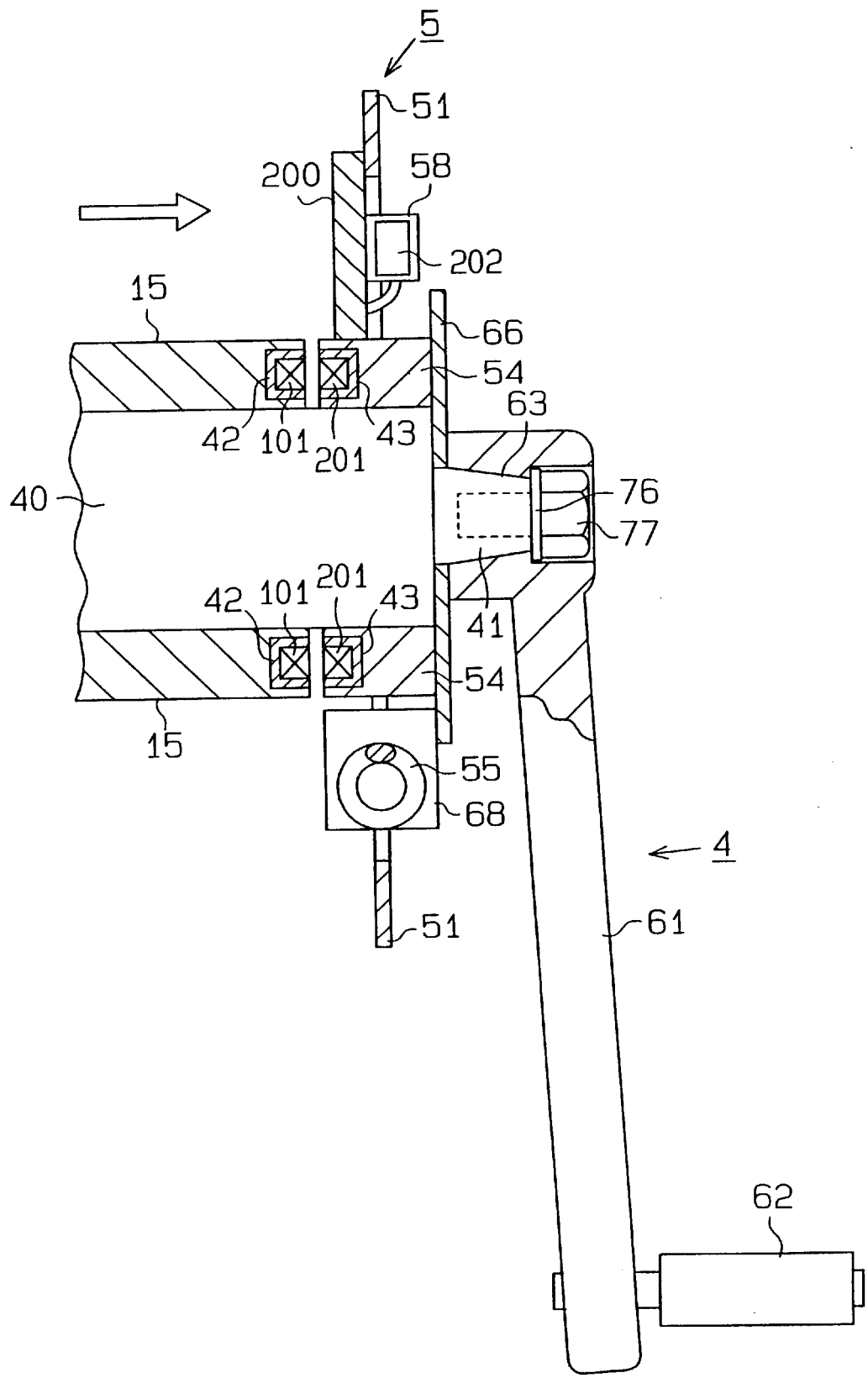
FIG. 5 is a cross-sectional view taken along line 5—5 in FIG. 4 and showing the pedalling mechanism.

As shown in FIGS. 4 and 5, the pedalling mechanism 4 includes a crank axle 40 pivotally supported in the bottom bracket 15, a crank arm 61 fixed on each end of the crank axle 40, a pedal 62 pivotally supported at the distal end of each crank arm 61, and a drive gear 5. The drive gear 5 is a sprocket and fitted to the right end of the crank axle 40 and supported rotatably relative to the crank axle 40.

More specifically, a block 41 projects from each end of the crank axle 40 (only right end shown) to engage the associated crank arm 61. The block 41 is received in a square cavity 63 formed at the basal end of the crank arm 61. A nut 77 is inserted through a washer 76 and fastened to a threaded hole, which is formed in the block 41, to fix the crank arm 61 to the crank axle 40.

The crank axle 40 is connected to the drive gear 5 by coil springs 55. The rear wheel 17 has an axle 72. A driven gear 73, which is a sprocket, is fit on the axle 72. An endless chain 75 connects the driven gear 73 and the drive gear 5 to transmit drive force produced by manpower to the rear wheel 17. A known one-way clutch (not shown) is arranged between the axle 72 of the rear wheel 17 and the driven gear 73.

Figure 6:
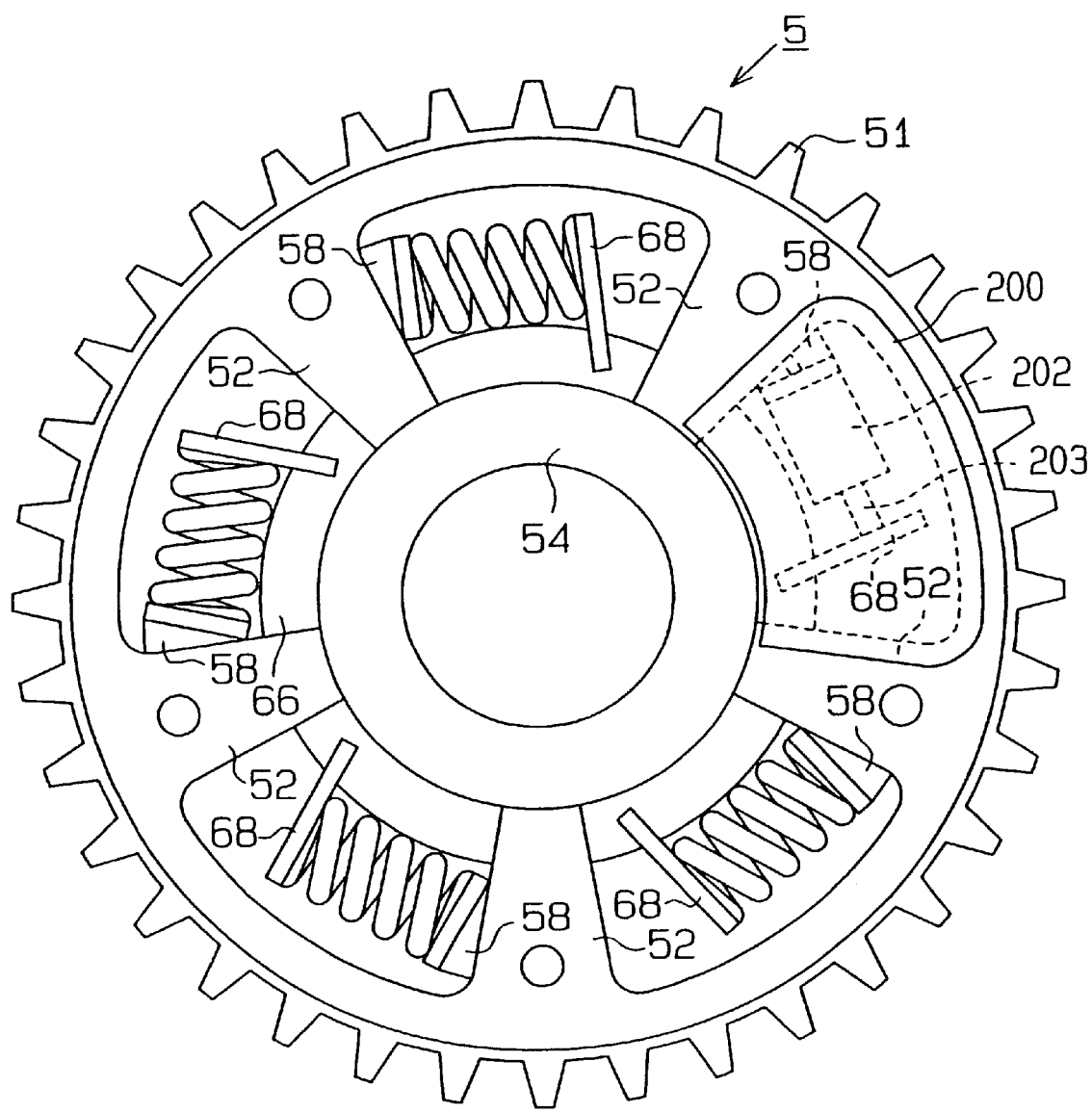
FIG. 6 is a front view of the pedalling mechanism of FIG. 4.

As shown in FIG. 6, the drive gear 5 has a toothed portion 51 defined at its periphery, a hub ring 54 defined at the central portion, and five ribs 52 connecting the toothed portion 51 and hub ring 54. A rotated circuit 200 is arranged on the surface of the drive gear 5 that is close to the bottom bracket 15.

The outer diameter of the rear wheel 17 is smaller than that of the front wheel 16. An auxiliary power unit 2 is installed on the frame 11 between the seat tube 12 and the rear wheel 17 to supplement the drive force produced by manpower. The auxiliary power unit 2 includes a motor 22, which serves as an auxiliary power source, and a transmitting mechanism 3, which decelerates the speed of the motor 22 and transmits the rotating force of the motor 22 to the rear wheel 17.

Figure 3:
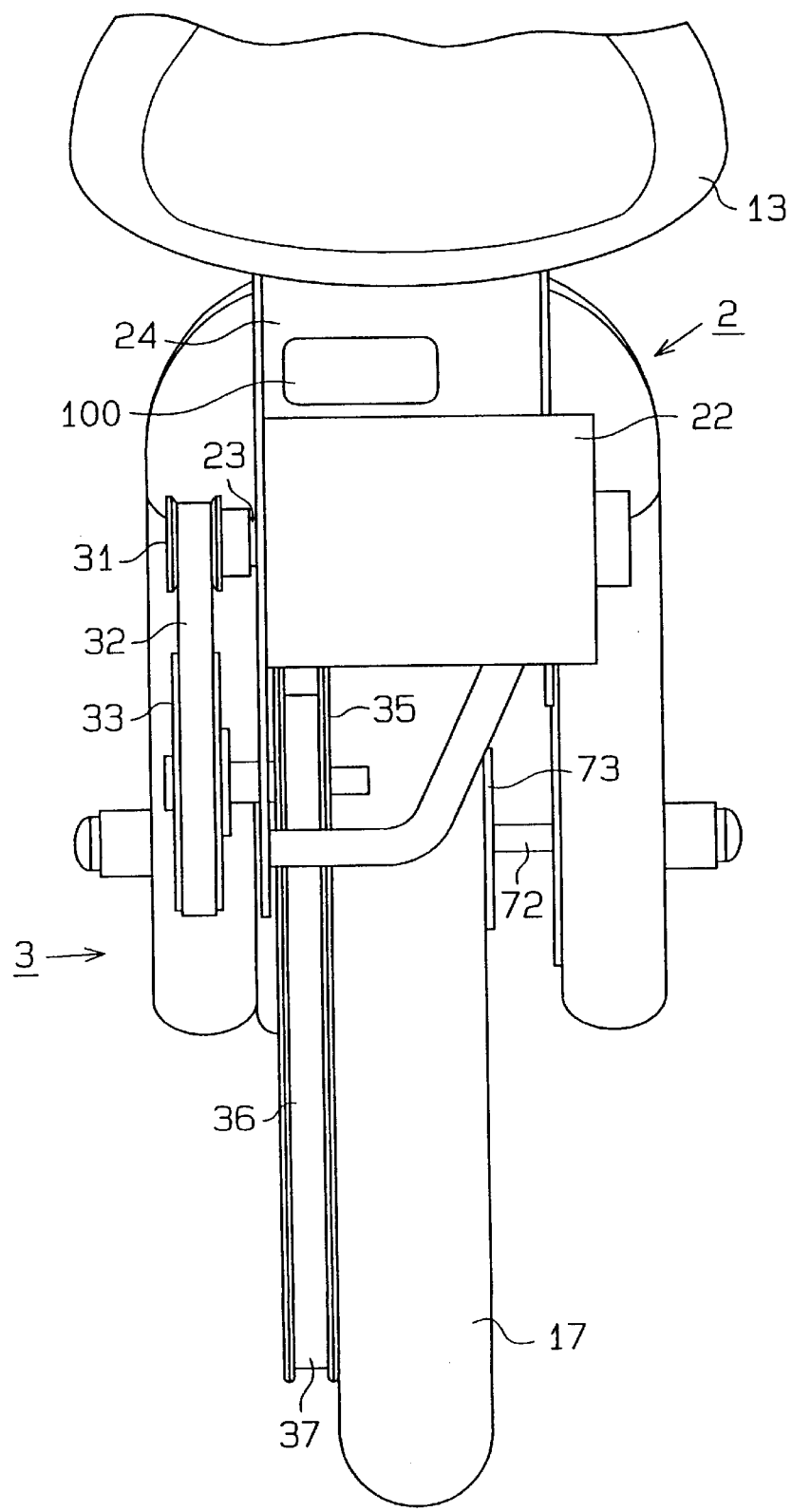
FIG. 3 is a plan view showing a driving mechanism of the auxiliary powered manpowered vehicle of FIG. 1.

More specifically, as shown in FIGS. 2 and 3, a base plate 24 is secured to the frame 11 by a fastener 21. A fixed circuit 100, which includes a fixed coil 201 that will be described later, is arranged on the upper surface of the base plate 24.

The base plate 24 has a wall, the right side on which the motor 22 is arranged. The motor 22 has an output shaft 23, which is fixed to a drive pulley 31. The output shaft 23, the drive pulley 31, and a first driven pulley 33 are supported at the left side of the wall of the base plate 24. A belt 32 connects the drive pulley 31 and the first driven pulley 33.

A second driven pulley 35, which is co-axial with the first driven pulley 33 and has a diameter that is smaller than that of the first driven pulley 35, is fixed to one side of the first driven pulley 33.

The rear wheel 17 has a rim 71. A third driven pulley 37 is formed integrally with the left side of the rim 71. A belt 36 connects the second driven pulley 35 and the third driven pulley 37.

The rotating force of the motor 22 is transmitted to the first driven pulley 33 from the drive pulley 31, which rotates integrally with the output shaft 23 of the motor 22, by the belt 32. The rotating force is further transmitted from the second driven pulley 35 to the third driven pulley 37 by the belt 36. Thus, the speed of the motor 22 can be decelerated when driving the rear wheel 17 with the transmitting mechanism 3. The power produced by the motor 22 is controlled by a controller 130 based on torque detecting signals sent from the torque detector 50.

A battery 26, which serves as the electric power source of the motor 22, is attached to the seat tube 12.

The structure of the torque detector 50 will now be described.

FIRST EMBODIMENT

In a first embodiment, the coil springs 55 are arranged between the crank axle 40 and the drive gear 5. The rotation of the crank axle 40 is transmitted to the drive gear 5 by the coil springs 55. The torque applied to the drive gear 5 is measured by detecting the relative displacement amount between the crank axle 40 and the drive gear 5 in the rotating direction when the coil springs 55 contract.

As shown in FIG. 4, a disk-like support plate 66 is secured to the basal end of the right crank arm 61. Five equally spaced pressing pieces 68 extend from the periphery of the support plate 66 on the surface facing the drive gear 5 (left surface).

As shown in FIG. 6, a holding piece 58 is secured to each of the four ribs 52 of the drive gear 5 to hold one of the coil springs 55, which serves as an elastic body and which extends in the reverse rotating direction of the drive gear 5. One of the holding pieces 58 is also secured to the remaining rib 52 to hold a direct-acting type potentiometer 202, which serves as a variable impedance means and which extends in the reverse rotating direction of the drive gear 5. The potentiometer 202 includes a detecting pin 203 to detect displacement. The projecting amount of the pin 203 varies an electric resistance value in a proportional or inverse proportional manner.

The distal end of the coil springs 55 abuts against four of the pressing pieces 68, while the distal end of the detecting pin 203 of the potentiometer 202 presses one of the pressing pieces 68.

In this structure, if the pedals 62 are turned, the support plate 66 rotates integrally with the crank axle 40. This causes the four pressing pieces 68, which oppose the coil springs 55, to press the coil springs 55 and rotate the drive gear 5, which further rotates the rear wheel 17 with the chain 75. If the force applied to the drive gear 5 when turning the pedals 62 is small and the load applied to the rear wheel 17 is thus small, that is, if the bicycle advances easily, the contracted amount of the coil springs 55 is small. Hence, the crank axle 40 and the drive gear 5 substantially rotate integrally with each other with substantially no relative rotational displacement. Accordingly, the detecting pin 203 of the potentiometer 202 is substantially not pressed by the associated pressing piece 68.

On the other hand, if the force applied to the drive gear 5 is large and the load acting on the rear wheel 17 is thus large, that is, if it is difficult for the bicycle 1 to advance, the coil springs 55 pressed by the pressing pieces 68 deform greatly. This causes rotational displacement of the drive gear 5 with respect to the crank axle 40. In this state, the detection pin 203 of the potentiometer 202 is pressed by the associated pressing piece 68 such that its projecting amount changes greatly and thus varies the resistance value.

Figure 7:
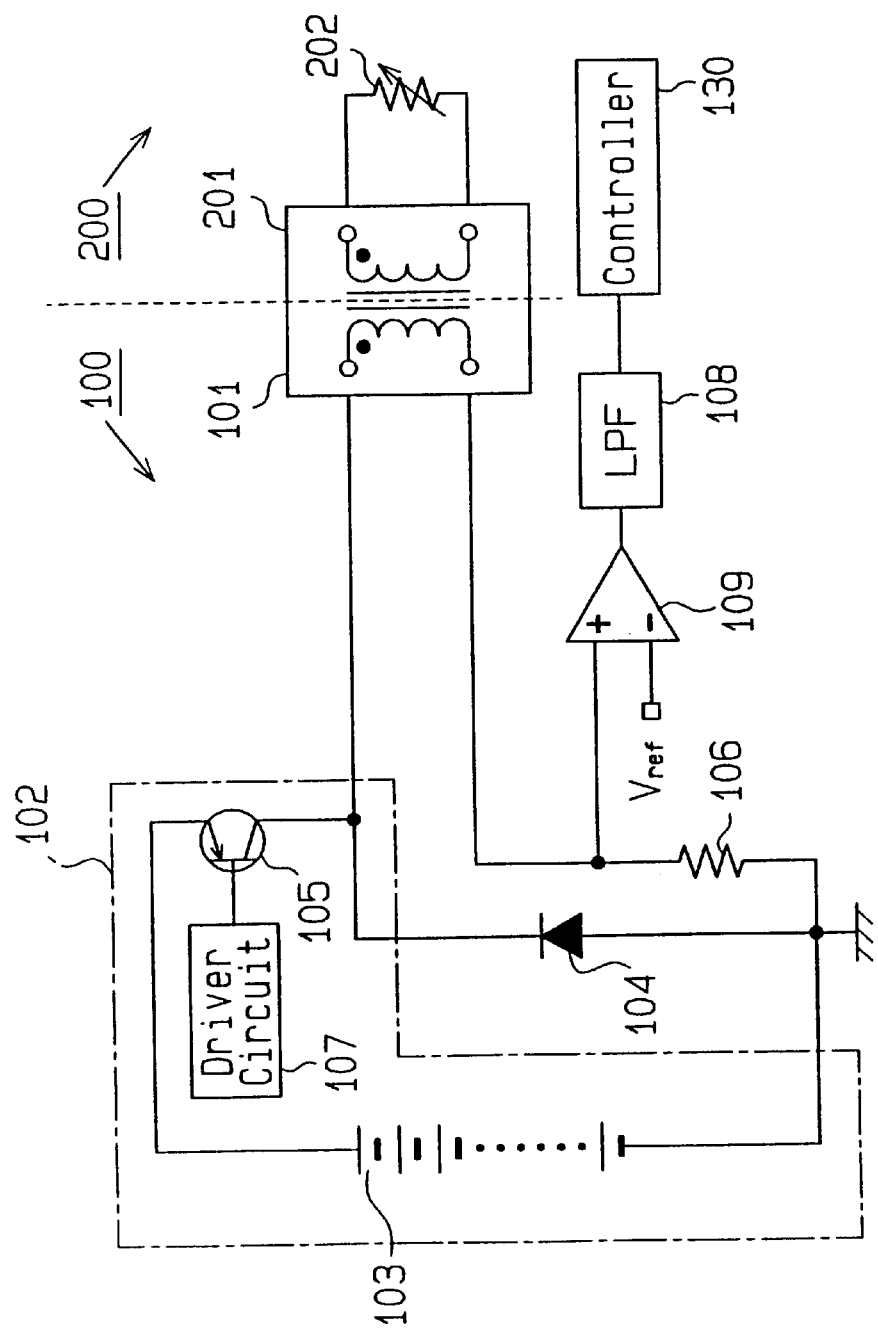
FIG. 7 is a block diagram showing a torque detecting circuit employed in the first embodiment.

As shown in FIG. 5, a cross-sectionally U-shaped ring core 43, which has an opening that faces the bottom bracket 15, is arranged in the side of the hub ring 54 facing the bottom bracket 15. A rotary coil 201, which is wound to extend in the rotating direction of the drive gear 5, is arranged in the ring core 43. As shown in FIG. 7, the rotary coil 201 is electrically connected to the potentiometer 202 to form the rotated circuit 200.

At a position corresponding to the rotary coil 201 in the bottom bracket 15, a cross-sectionally U-shaped ring core 42 having an opening that faces the rotary coil 201 is arranged. The fixed coil 101, which is wound to extend in the rotating direction of the drive gear 5, is arranged in the ring core 42 parallel to and in the vicinity of the rotary coil 201. A closed magnetic circuit is formed by arranging the cross-sectionally U-shaped ring cores 42, 43 with their openings facing each other. The ratio of the number of windings of the coils 101, 201 is arbitrary and may be, for example, 1 to 1. However, the ratio varies in accordance with the conditions of the element, or the like, that is employed as the variable impedance means.

As shown in FIG. 7, the fixed coil 101 has a first end connected to a direct current power source 103 of an electric power source circuit 102, which includes a switching transistor 105, to form the fixed circuit 100. Although the space between the coils 101, 201 is preferably one millimeter or smaller, the space is not limited to such values.

The fixed coil 101 also has a second end which is grounded by way of a resistor 106. The collector side of the transistor 105 is grounded by way of a circulating diode 104.

A differential amplifier 109, which serves as a detecting means, has an input connected to the fixed coil 101 and the resistor 106 and outputs the voltage difference between the voltage drop in the current flowing through the fixed coil 101 caused by the resistor 106, and a reference voltage $V_{ref}$, which will be described later. The voltage difference is smoothed by a low-pass filter 108 and then supplied to the controller 130.

Figure 8A:
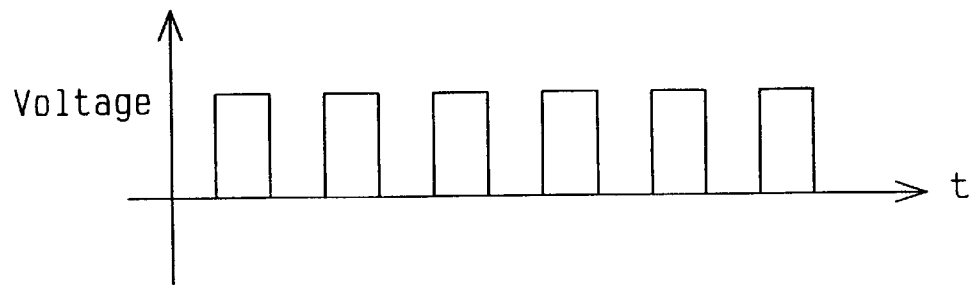
FIGS. 8(a) and 8(b) are graphs showing the waveform of the voltage applied to a fixed coil and the waveform of the current produced by the voltage application.

A driver circuit 107 inputs a rectangular wave signal having a predetermined interval (about 20 kHz), as shown in FIG. 8(a), into the base of the transistor 105. The ON/OFF of the signal controls the supply of electric power and applies a rectangular wave voltage to the fixed coil 101.

Therefore, a pulsating current flows through the fixed coil 101. Mutual induction of the fixed coil 101 and the rotary coil 201 causes the current flowing through the fixed coil 101 to be affected by changes in the impedance of the rotated circuit 200, which includes the rotary coil 201. The coils 101, 201 are not connected directly. Thus, induced electromotive force is generated in the rotary coil 201 by the mutual induction that occurs between the rotary coil 201 and the fixed coil 101. Current then flows in the rotated circuit 200 and generates self induction electromotive force in the rotary coil 201. Accordingly, induced voltage corresponding to the electromotive force, which is the sum of the mutual induction electromotive force and the self induction electromotive force, is generated. The induced voltage generates current that flows through the rotated circuit 200. The current causes mutual induction acting on the fixed coil 101 and generates induced electromotive force in the fixed coil 101.

If the pedals 62 are not turned or if the pedals 62 are turned but the drive gear 5 rotates integrally with the crank axle 40, there is no relative displacement between the drive gear 5 and the crank axle 40 in the rotating direction. Thus, the resistance value of the potentiometer 202, which is connected to the rotary coil 201, remains substantially unchanged. The rotary coil 201 and the fixed coil 101 are coaxial. Hence, interlinkage magnetic flux does not change even if the rotary coil 201 is rotated with respect to the fixed coil 101 since the rotary coil 201 and the fixed coil 101 are concentric. In this state, the current that flows through the fixed coil 101 has a predetermined waveform corresponding to the voltage generated by the self induction and mutual induction of the fixed coil 101, as shown by the solid line in FIG. 8(b).

If there is no relative displacement between the drive gear 5 and the crank axle 40, part of the ON/OFF control signals applied to the base of the transistor 105 by the driver circuit 107 is output as the reference voltage waveform $V_{ref}$ through an integrating circuit and applied to a reference voltage terminal of the differential amplifier 109 such that the voltage waveform at the resistor 106 matches the waveform and the phase of the reference voltage waveform $V_{ref}$.

A great load is applied to the drive gear 5 when turning the pedals 62 to start moving the bicycle 1, accelerate the bicycle 1, or climb slopes with the bicycle 1. The load compresses and deforms the coil spring 55. This displaces the drive gear 5 with respect to the crank axle 40.

Figure 8B:
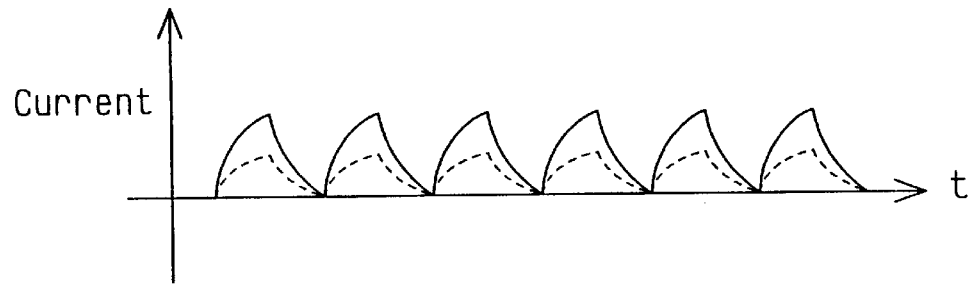

If a displacement takes place between the drive gear 5 and the crank axle 40, the detecting pin 203 of the potentiometer 202 is pressed by the associated pressing piece 68. This increases the resistance value and varies the current flowing through the rotated circuit 200. Accordingly, the current flowing through the fixed coil 101 is affected by the change in the resistance value such that, as shown in FIG. 8(b), the waveform changes from the predetermined waveform (solid line) to, for example, the waveform shown by the dashed line.

The voltage waveform measured at the resistor 106 as caused by the current waveform is proportional to the waveform change. The differential amplifier 109 measures the difference between the detected voltage waveform and the reference voltage waveform $V_{ref}$ to output a voltage difference signal.

The voltage difference signal detected by the differential amplifier 109 is smoothed by the low-pass filter and sent to the controller 130 as a direct current voltage signal.

Figure 9:
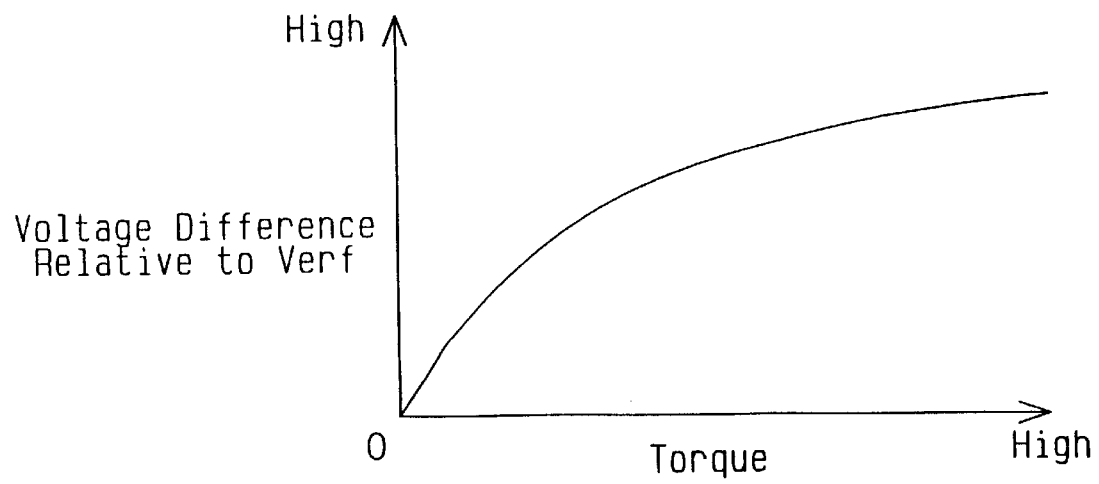
FIG. 9 is a graph showing the relationship between the torque applied to a drive gear and the output of a differential amplifier.

The controller 130 includes a memory (not shown) in which the relationship between the voltage difference and the torque applied to the drive gear 5, as shown in FIG. 9, is saved. The motor 22 generates a drive force corresponding to the voltage difference signal. The drive force is transmitted to the rear wheel 17 by the transmitting mechanism 3 to supplement manpower.

In this first embodiment, signals are transmitted between the rotary coil 201 and the fixed coil 101 via a predetermined space therebetween. This prevents the generation of noise that would be generated when employing a slip ring or a brush. Thus, torque is detected accurately. Furthermore, the production of uncomfortable aural noise caused by friction, which would be generated when using a slip ring or a brush, is prevented. Additionally, there are no worn parts to replace.

In this embodiment, the drive gear 5 and the crank axle 40 are connected by the coil springs 55 such that they are rotated integrally with each other. Thus, if a load is applied, the drive gear 5 and the crank axle 40 are displaced relative to each other in the rotating direction. However, the drive gear 5 and the crank axle 40 are not moved axially. Accordingly, space for permitting such movement of the drive gear 5 need not be provided. Thus, the torque detector 50 may have a thin structure.

In this embodiment, the rotary coil 201 is arranged in the drive gear 5. However, the rotary coil 201 may be arranged in the peripheral portion of the crank axle 40.

In this embodiment, the direct-acting type potentiometer 202 is employed as the variable impedance means. However, a rotating type potentiometer, other types of variable resistors (e.g., magnetic resistance device and magnet), a variable capacitance capacitor, or a variable impedance coil may also be employed as the variable impedance means.

In this embodiment, the coil springs 55 are employed as the elastic body. However, leaf springs, rubber, or the like may also be employed as the elastic body.

SECOND EMBODIMENT

In the first embodiment, the torque applied to the drive gear 5 is measured by detecting the change in voltage at the resistor 106 when current flows through the fixed coil 101.

As shown in FIGS. 10 to 13, the second embodiment employs an inductor as a variable impedance means. An LC oscillator circuit 207 is provided in the rotated circuit 200 to serve as a rotated oscillating means. The oscillating frequency of the LC oscillator circuit 207 is varied in accordance with the torque applied to the drive gear 5. The signal component of the LC oscillator circuit 207 is then superimposed with the voltage waveform of the rotated circuit 200 and transmitted to the fixed coil 101 via electromagnetic induction. The oscillating frequency of the LC oscillator circuit 207 is measured by the fixed circuit 100 to detect the torque applied to the drive gear 5. The description of this embodiment will center mainly on parts differing from the first embodiment.

Figure 10:
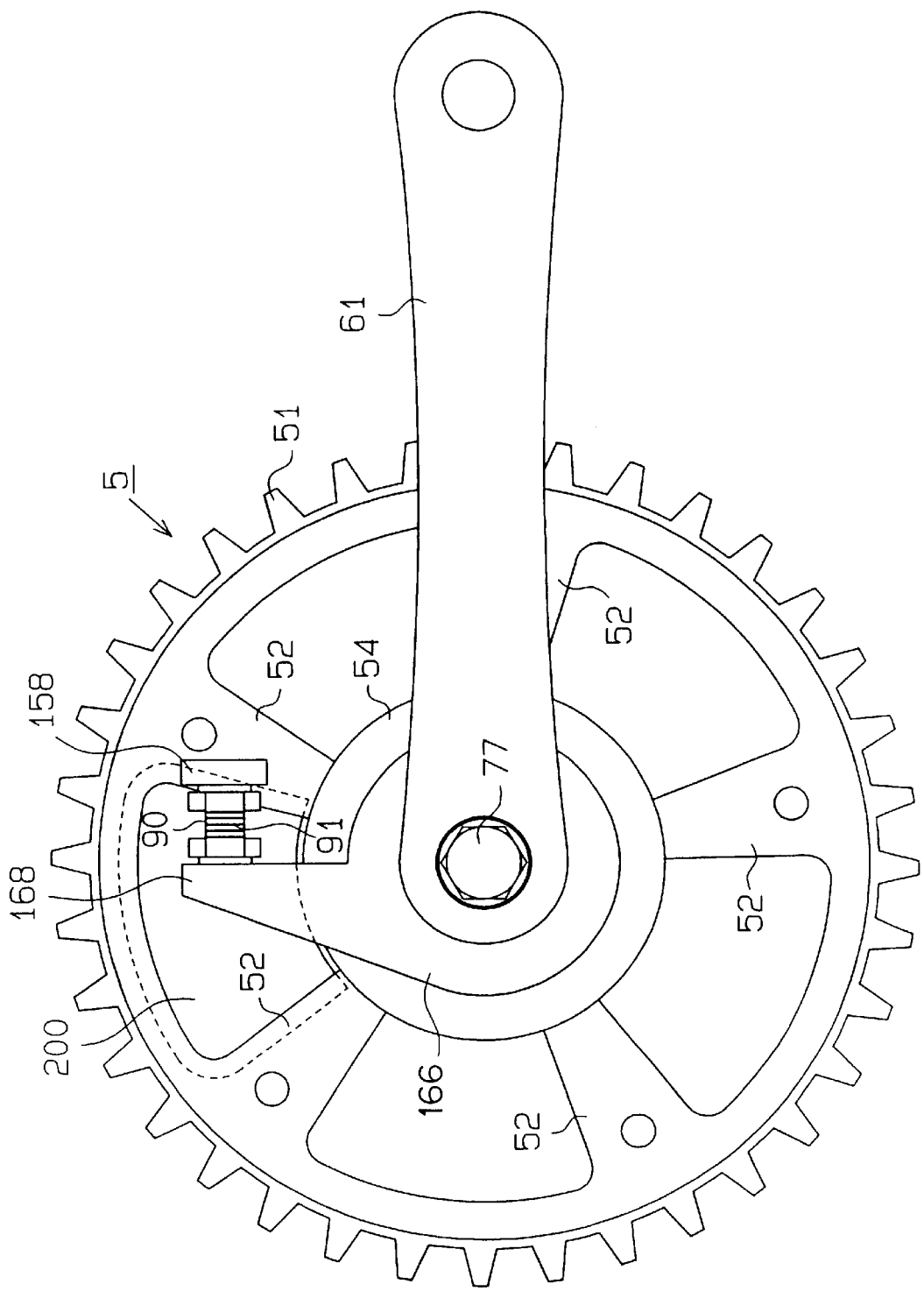
FIG. 10 is a front view showing the structure of a pedalling mechanism employed in a second embodiment of the present invention.
Figure 11:
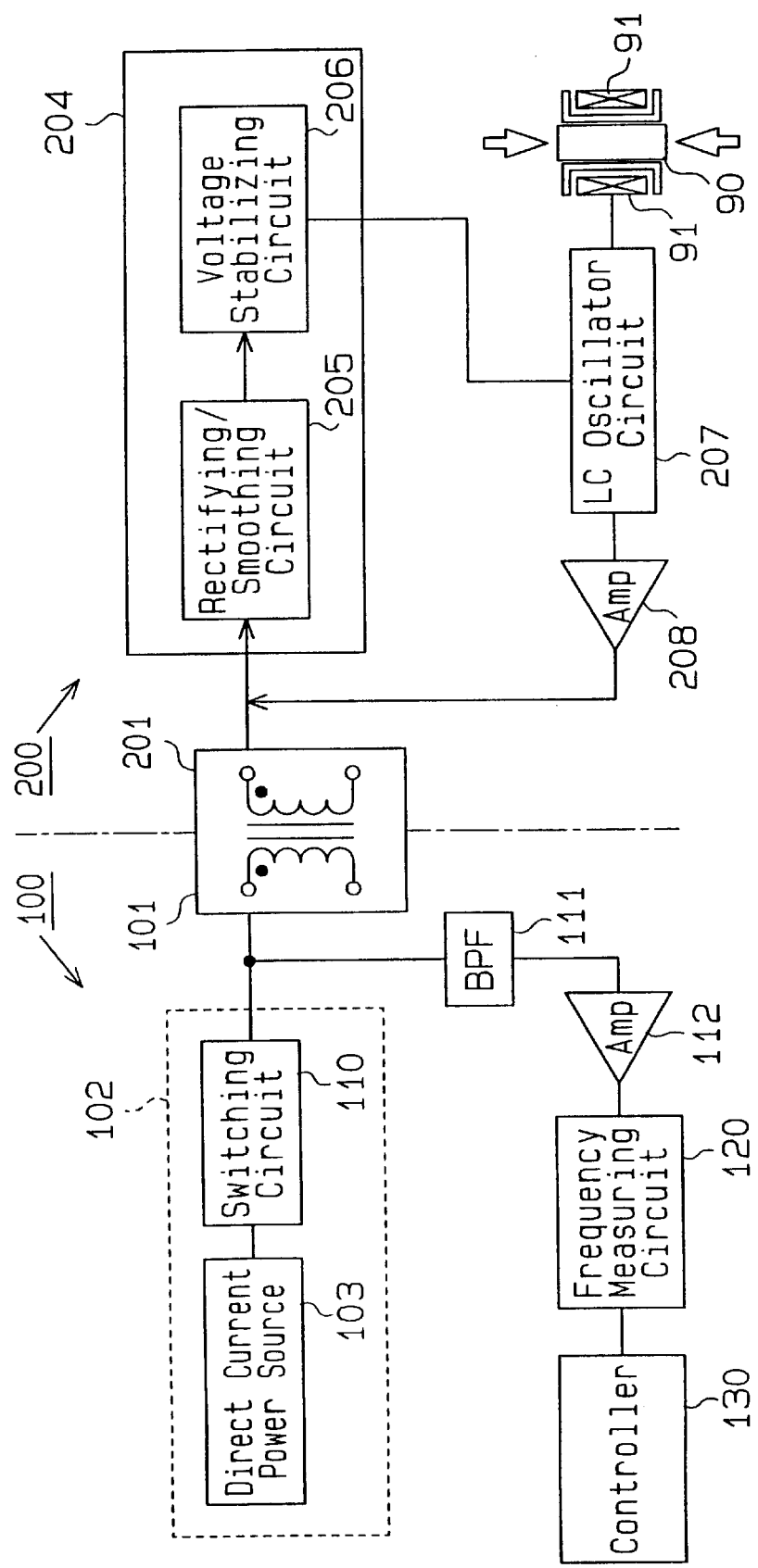
FIG. 11 is a block diagram showing a torque detecting circuit employed in the second embodiment.

As shown in FIG. 10, a support plate 166 is fixed to the basal end of the crank arm 61. A pressing piece 168 extends from the peripheral portion of the support plate 166. The drive gear 5 has five ribs 52, one of which has a receiving piece 158 extending therefrom and arranged facing the pressing piece 168. A rotated circuit 200, which is illustrated in FIG. 11, extends between the rib 52 having the receiving piece 158 and the adjacent rib 52.

The pressing piece 168 and the receiving piece 158 are connected to each other by a cylindrical core 90, which is made of a magnetostrictive material. Thus, the crank axle 40 and the drive gear 5 are rotated integrally with each other.

A coil 91 is wound about the core 90 to form an inductor, which serves as the variable impedance means. The coil 91 is connected to the rotated circuit 200.

The rotated circuit 200 has a rotary coil 201, which is arranged in the vicinity of the fixed coil 101, and a rectifying power source circuit 204. The rectifying power source circuit 204 is connected to the LC oscillator circuit 207, which oscillates sine waves, the core 90 and coil 91, which serve as an inductance circuit of the LC oscillator circuit 207, and an amplifier 208, which amplifies the signals oscillated by the LC oscillator circuit 207 and transmits the signals to the rotary coil 201.

The rectifying power source circuit 204 includes a rectifying/smoothing circuit 205 and a voltage stabilizing circuit 206. The electromotive force generated in the rotary coil 201 by electromagnetic induction, which is based on the alternating voltage of the fixed coil 101, is rectified and smoothed by the rectifying/smoothing circuit 205. The voltage stabilizing circuit 206 then stabilizes the voltage of the electromotive force and actuates the rotated circuit 200.

As shown in FIG. 11, the fixed circuit 100 includes the power source circuit 102, the fixed coil 101, which is connected to the power source circuit 102, and a bandpass filter 111, through which signals having the same frequency bandwidth as the LC oscillator circuit 207 pass. The fixed circuit 100 includes a frequency measuring circuit 120 connected to the amplifier 112, and a controller 130, which is connected to the frequency measuring circuit 120. In the same manner as the first embodiment, the fixed circuit 100 is arranged on the base plate 24.

The power source circuit 102 includes a direct current power source 103, which generates a direct current voltage using the battery 26 for driving the motor 22, and a switching circuit 110, which ON/OFF drives the voltage generated by the direct current power source 103 at a predetermined interval (about 20 kHz) by means of pulse width modulation (PWM). This causes a rectangular waveform voltage having a predetermined interval to be applied to the fixed coil 101.

Figure 12:
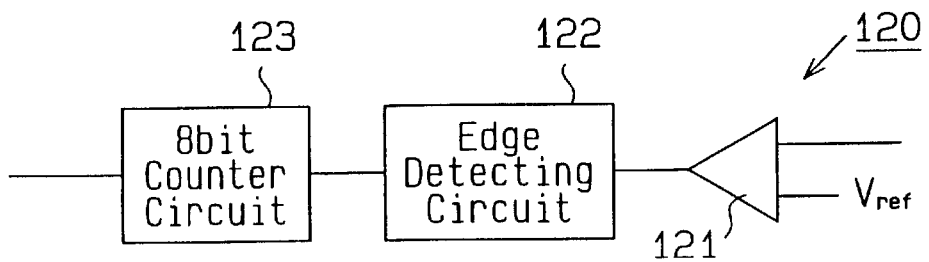
FIG. 12 is a block diagram showing a frequency monitoring circuit employed in the second embodiment.

As shown in FIG. 12, the frequency measuring circuit 120 has a comparator 121, an edge detecting circuit 122, and a counter circuit 123. The voltage waveform (oscillating waveform) transmitted from the rotated circuit 200 passes through the bandpass filter 111 to separate the switching waveform of the power source circuit 102. The amplifier 112 then amplifies the waveform. Afterward, the comparator circuit 121 compares the amplified waveform with a predetermined voltage. The portions of the voltage waveforms that are equal to or greater than the predetermined voltage are converted to the power source voltage level (high level). The remaining portions are converted to the ground level to synthesize a square wave. The edge detecting circuit 122 detects the leading edge and trailing edge of the square wave to form edge pulses. Thus, edge pulses, which have a cycle corresponding to the frequency of the alternating voltage waveform transmitted to the fixed coil 101, are obtained.

The edge pulses are input to the counter circuit 123, which operates at a speed much faster than the oscillating frequency of the LC oscillator circuit 207, for example, a free-running frequency of 8 MHz. Each time the edge pulses are input to the counter circuit 123, the counter value is output to the control circuit 130 and then cleared. As a result, the cyclic interval of the edge pulses is represented as the counter value of the counter circuit 123. Accordingly, the frequency of the voltage waveform transmitted to the fixed coil 101 from the rotated circuit 200, or the oscillating frequency of the LC oscillator circuit 207, is detected.

The operation of the fixed circuit 100 and the rotated circuit 200 employed in this embodiment will now be described with reference to FIGS. 11 and 12.

When the power source circuit 102 of the fixed circuit 100 applies a rectangular waveform voltage (20 kHz), which is ON/OFF controlled by the switching circuit 110, on the fixed coil 201, electromagnetic induction between the rotary coil 201 and the fixed coil 101 generates an induced electromotive force in the rotary coil 201 in the same manner as the first embodiment. Thus, an induced current flows in the rotated circuit 200.

The electromotive force generated in the rotated circuit 200 forms an alternating waveform. The rectifying power source circuit 204 rectifies and smooths the alternating waveform to obtain a constant voltage. The rectifying power source circuit 204 supplies the LC oscillator circuit 207 with the constant voltage so that it oscillates at a frequency corresponding to the inductance of the coil 91 (20 kHz or higher and 100 kHz or lower).

Figure 13A:
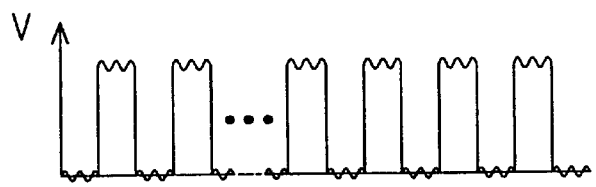
FIGS. 13(a) and (b) are graphs plotted when using the torque detecting method of the second embodiment and show (a) the waveform of the voltage applied to a fixed coil and (b) the waveform of the voltage produced by a bandpass filter.

The oscillating voltage waveform generated by the LC oscillator circuit 207 is amplified by the amplifier 208 and applied to the rotary coil 201. The voltage waveform is superimposed with the voltage waveform of the rotated circuit 200 causing mutual induction between the rotary coil 201 and the fixed coil 101, which generates an induced electromotive force in the fixed coil 101. In other words, as shown in FIG. 13(a), the voltage waveform generated by mutual induction, which occurs due to the rectangular waveform voltage supplied by the power source circuit 102, is superimposed with the oscillating voltage waveform oscillated by the LC oscillator circuit 207.

Figure 13B:

As shown in FIG. 13(b), the bandpass filter 111 extracts frequency components from the signal generated by the LC oscillator circuit 207 on the voltage waveform of the fixed coil 101 and inputs the filtered waveform to the frequency measuring circuit 120 by way of the amplifier 112.

The frequency measuring circuit 120 counts the cycles of the edge pulses produced by the input voltage waveform. The count value is then input to the control circuit 130. The count value indicates the torque applied to the drive gear 5.

The controller circuit 130 includes a memory (not shown) to store the relationship between the torque to be applied to the drive gear 5 and the output value of the frequency measuring circuit 120.

A great load is applied to the drive gear 5 when turning the pedals 62 to start moving the bicycle 1, accelerate the bicycle 1, or climb slopes with the bicycle 1. The load compresses and deforms the coil spring 55, which displaces the drive gear 5 with respect to the crank axle 40. The load applies a compressing force on the core 90, which is made of a magnetostrictive material and arranged between the crank axle 40 and the drive gear 5. This alters the magnetic flux of the magnetostrictive material and changes the inductance of the coil 91. The change in the inductance varies the oscillating frequency of the LC oscillator circuit 207. The varied oscillated frequency appears as a change in the count value, which is measured by the frequency measuring circuit 120 of the fixed circuit 100.

The controller 130 drives the motor 22 in accordance with the change in the count value. The drive force of the motor 22 is transmitted to the rear wheel 17 through the transmitting mechanism 3 to supplement manpower.

In this embodiment, the variable impedance means comprises the core 90, which is a magnetostrictive material, and the coil 91, which is wound about the core 90. Therefore, relative displacement between the crank axle 40 and the drive gear 5 practically does not take place. Accordingly, pedaling is continued without the rider noticing any changes.

Since there is substantially no mechanical displacement of the core 90, errors that would result from such displacement are small and the torque applied to the drive gear 5 is measured accurately.

Changes in the torque applied to the drive gear 5 are detected in accordance with changes in the oscillating frequency of the LC oscillator circuit 207. Thus, even if the rotary coil 201 is moved by external force or displaced during assembly, the amplitude of the torque detecting signal may change but its frequency will not change. Accordingly, mechanical errors of the rotary coil 201 will not affect torque changes. This leads to accurate detection with high reliability.

This embodiment may employ a charging capacitor in the rectifying power source circuit 204 of the rotated circuit 200 and stop the voltage ON/OFF control, which is executed by the power source circuit 102 of the fixed circuit 100, for a predetermined period. During the stopped period, electric discharge from the capacitor actuates the LC oscillator circuit 207. The oscillating frequency is measured by the frequency measuring circuit 120 by the amplifier 208 in the same manner as described above.

Figure 14A:
FIGS. 14(a) and (b) are graphs plotted when using another torque detecting method of the second embodiment and show (a) the waveform of the voltage applied to a fixed coil and (b) the waveform of the voltage produced by a bandpass filter.
Figure 14B:
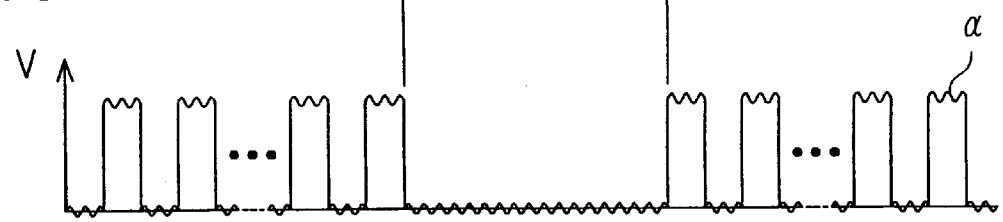

In this case, the voltage waveform shown by α in FIG. 14(b) is input into the fixed coil 101. The frequency during stoppage of power supply (period A) is amplified by the amplifier 112 and measured by the frequency measuring circuit 120.

Accordingly, the waveform obtained by superimposing the voltage waveform produced through mutual induction of the rectangular waveform supplied to the power source circuit 102 and the oscillating waveform generated by the LC oscillator circuit 207 need not be filtered to extract only the oscillator voltage waveform. Furthermore, interference between the frequency of the rectangular waveform voltage, which is supplied by the power source circuit 102, and the frequency of the oscillating waveform generated by the LC oscillator circuit 207 becomes null. Accordingly, the frequency of the voltage waveform generated by the LC oscillator circuit 207 is detected accurately in the fixed circuit 100.

This embodiment employs the LC oscillator circuit 207 as a rotated oscillator means. However, an astable multivibrator may be employed instead. Furthermore, if a potentiometer is employed as the variable impedance means, an RC oscillator circuit may be employed as the rotated oscillator means.

In this embodiment, the rotated circuit 200 is actuated by the power supplied by the fixed circuit 100. Alternatively, however, a battery may be employed in the rotated circuit 100. In this case, the fixed circuit 100 need not supply power to the rotated circuit 200. In this case, the switching circuit 110 in the fixed circuit 100 and the rectifying power source circuit 204 in the rotated circuit 200 become unnecessary.

THIRD EMBODIMENT

The rotated circuit 200 employed in this embodiment differs from that employed in the above embodiments. Parts similar to that employed in the first and second embodiments will not be described. In this embodiment, the structure of the fixed circuit 100 is the same as that of the second embodiment.

Figure 15:
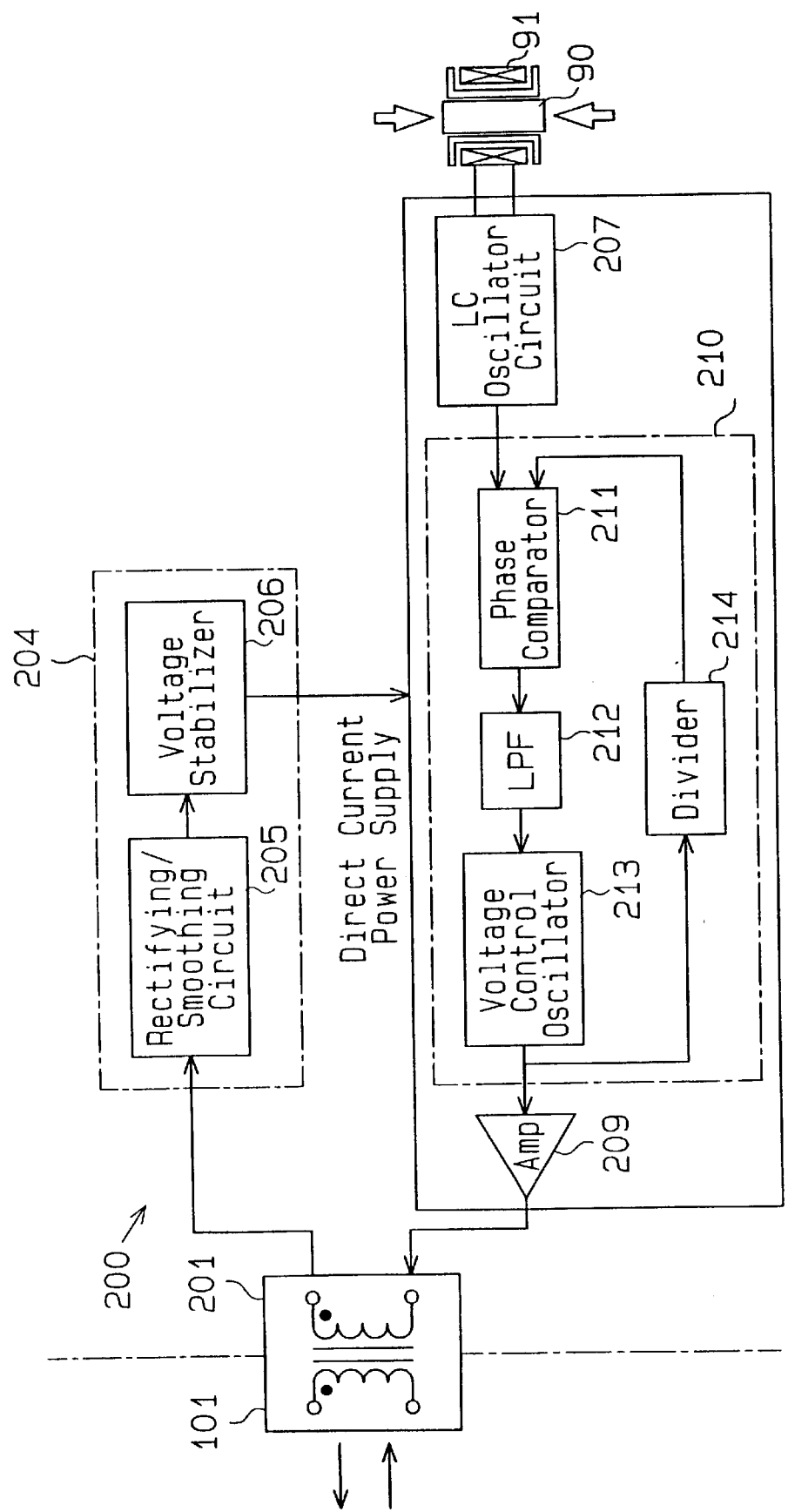
FIG. 15 is a block diagram showing a torque detecting circuit employed in a third embodiment.

As shown in FIG. 15, in the rotated circuit 200, a rotary coil 201 is connected to a rectifying power source circuit 204, which includes a rectifying/smoothing circuit 205 and a voltage stabilizing circuit 206. The rotated circuit 200 further includes a phase locked loop (PLL) circuit 210, which is supplied with electric power by the rectifying power source circuit 204, and an LC oscillator circuit 207.

Figure 16:
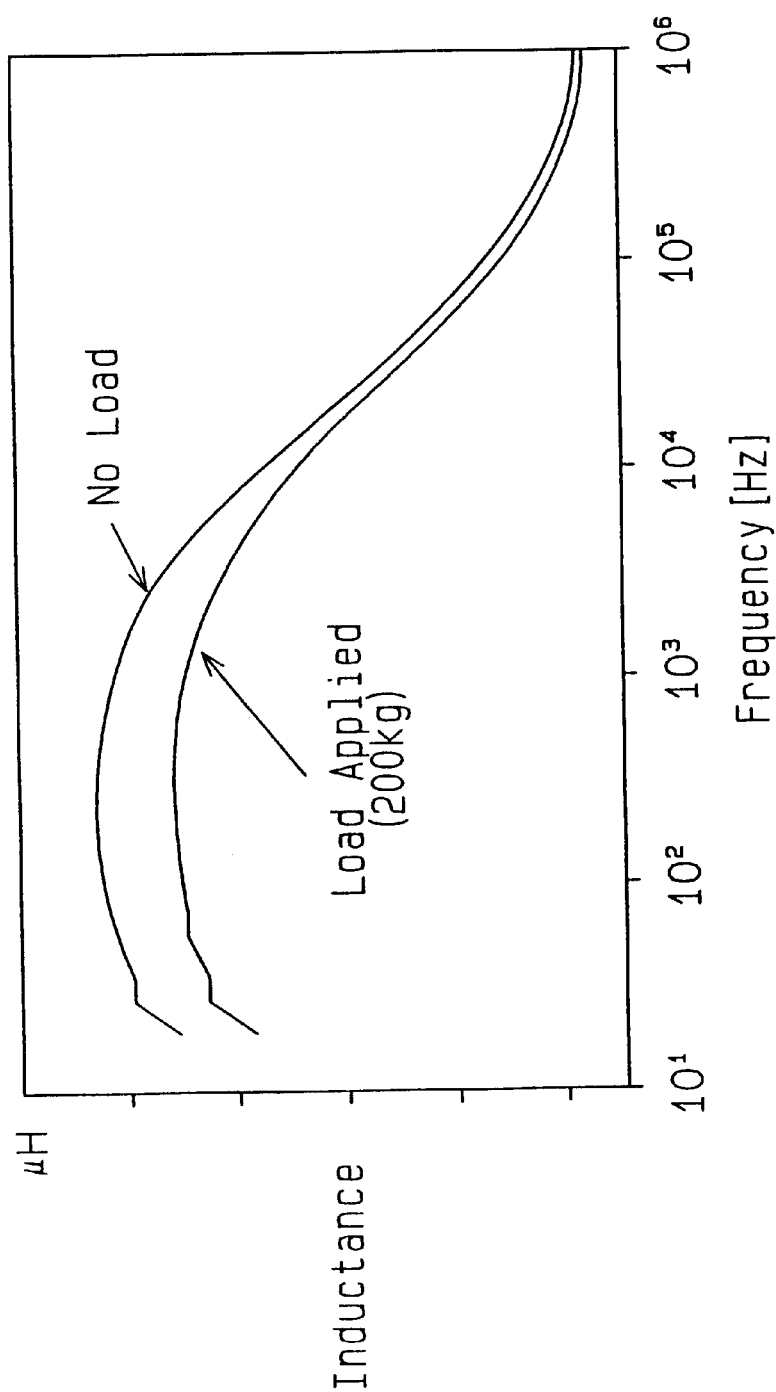
FIG. 16 is a graph showing the characteristics of a core and a coil, which are employed in the second to a seventh embodiment.

In the same manner as the second embodiment, the drive gear 5 and the crank axle 40 are connected to a core 90 (refer to FIG. 10), which is made of a magnetostrictive material. A coil 91, which is connected to the LC oscillator circuit 207, is wound about the core 90. Inductance of the core 90 and the coil 91 changes greatly when the power supply voltage is in the frequency bandwidth of $10^2$ Hz to $10^4$ Hz, as shown in FIG. 16. However, changes in inductance may be detected as long as the power supply voltage remains lower than about $10^5$ Hz.

As shown in FIG. 15, the LC oscillator circuit 207 is connected to the PLL circuit 210, which includes a phase comparator 211, a low-pass filter 212, a voltage control oscillator 213, and a divider 214.

The signal input to the PLL circuit 211 (signal that oscillates at 20 kHz or higher and 100 kHz or lower) is converted to a control voltage by the phase comparator 211. The voltage control oscillator 213 then raises the oscillating frequency to the MHz band. Next, the signal is divided by the divider 214 at a dividing ratio of 1/100. The divided signal is then fed back to the phase comparator 211 so that its phase is compared with the oscillating frequency of the LC oscillating circuit 207.

The phase comparator 211 generates a control voltage corresponding to the phase difference between the two input signals. The low-pass filter 212 then eliminates the high harmonic components from the control voltage. When the control voltage is input in the voltage control oscillator 213, the oscillating frequency is raised to the MHz band. The signal is then amplified by the amplifier 209 and superimposed on the voltage waveform of the rotated circuit 200 and transmitted to the fixed circuit 100 by the electromagnetic induction of the coils 201, 101.

In this embodiment, the frequency of the voltage waveform generated by the LC oscillator circuit 207 of the rotated circuit 200, is raised from a bandwidth of 20 kHz or higher and 100 kHz or lower to the MHz band by the PLL circuit 210. Thus, interference with the voltage waveform (20 kHz), which is transmitted from the fixed circuit 100 to the rotated circuit 200 as a power source, does not occur. Accordingly, the frequency of the voltage waveform generated by the LC oscillator circuit 207, is accurately detected in the fixed circuit 100.

FOURTH EMBODIMENT

In the second and third embodiments, the LC oscillator circuit 207 is arranged in the rotated circuit 200, and the oscillating frequency of the LC oscillator circuit 207 is measured by the fixed circuit 100 in order to measure the torque applied to the drive gear 5.

Figure 17:
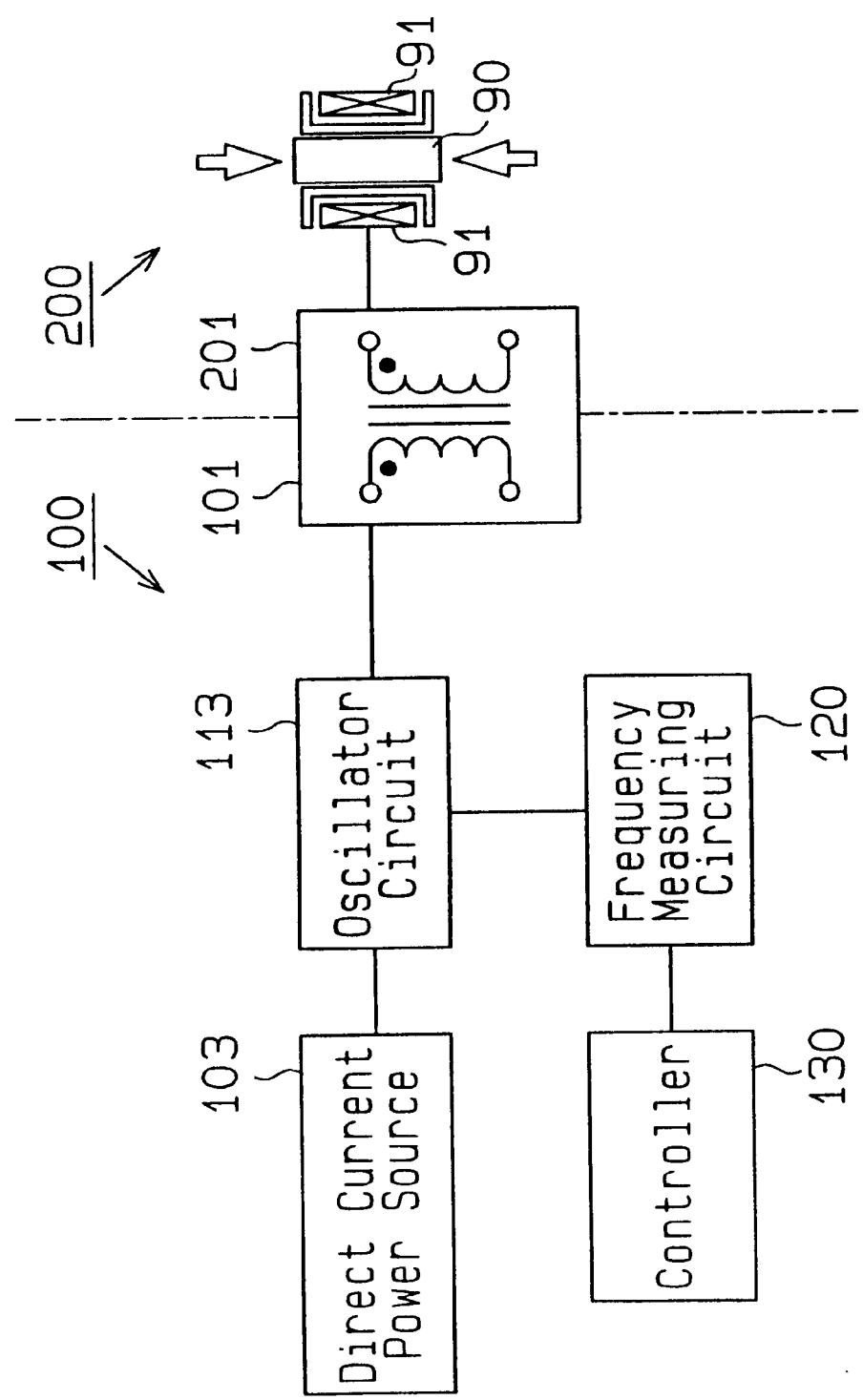
FIG. 17 is a block diagram showing a torque detecting circuit employed in a fourth embodiment.

In a fourth embodiment, as shown in FIG. 17, an LC oscillator circuit 113, which serves as a fixed oscillating means, is arranged in the fixed circuit 100. The inductance at the side of the fixed coil 101 is varied in accordance with the torque applied to the drive gear 5. In this state, the oscillating frequency of the LC oscillator circuit 113 is measured to obtain the torque applied to the drive gear 5.

The frequency measuring circuit 120 employed in this embodiment is the same as that employed in the second embodiment.

In the same manner as the second embodiment shown in FIG. 10, the drive gear 5 and the crank axle 40 are connected to each other by a core 90, which is made of a cylindrical magnetostrictive material. As shown in FIG. 17, the rotated circuit 200 includes the core 90, which serves as a variable impedance means and is made of a magnetostrictive material, the coil 91, and the rotary coil 201, which is connected to the coil 91.

The fixed circuit 100 includes a fixed coil 101, which is arranged near the rotary coil 201, the LC oscillator circuit 113 for varying the oscillating frequency in accordance with the inductance of the fixed coil 101, the frequency measuring circuit 120 for measuring the oscillating frequency of the signals oscillated by the LC oscillator circuit 113, a controller 130 for controlling the drive force of the motor 22 in accordance with the measuring results of the frequency measuring circuit 120, and a direct current power source 103.

The LC oscillator circuit 113 generates a sine wave that varies within an oscillating frequency of about 4.4 kHz to 4.7 kHz in accordance with changes in the inductance of the fixed coil 101. In this state, the inductance of the fixed coil 101 is determined by its self-inductance, the inductance of the rotary coil 201, and the inductance of the coil 91.

A great load is applied to the drive gear 5 when starting to move the bicycle 1, accelerating the bicycle 1, or climbing slopes with the bicycle 1. The load applies a compressing force to the core 90, which is made of a magnetostrictive material and located between the crank axle 40 and the drive gear 5. This alters the magnetic field of the core 90 and varies the inductance of the coil 91. As a result, the inductance of the fixed coil 101 is varied. Accordingly, the varied inductance of the fixed coil 101, which is connected to the LC oscillator circuit 113, changes the oscillating frequency of the LC oscillator circuit 113.

The oscillating voltage waveform generated by the LC oscillator circuit 113 is input to the frequency measuring circuit 120. The frequency measuring circuit 120 counts the cycle of the edge pulses generated by the oscillating voltage waveform and inputs the count value to the controller 130.

The controller 130 controls the drive force of the motor 22 based on the oscillating frequency of the LC oscillator circuit 113, which is stored in an incorporated memory (not shown), and the torque applied to the drive gear 5. The drive force is then transmitted to the rear wheel 17 by means of the transmitting mechanism 3 to supplement manpower.

In this embodiment, the LC oscillator circuit 113, which serves as a fixed oscillating means, is provided in the fixed circuit 100 to detect changes in the torque applied to the drive gear 5 caused by changes in the frequency of the LC oscillator circuit 113. Accordingly, power need not be supplied to the rotated circuit 200. This simplifies the structure of the rotated circuit 200.

FIFTH EMBODIMENT

In this embodiment, the cylindrical core 90, which is made of a magnetostrictive material, is supported in a different manner from the above embodiments. The core 90 is arranged in the space between the drive gear 5 and the crank arm 61.

Figure 18:
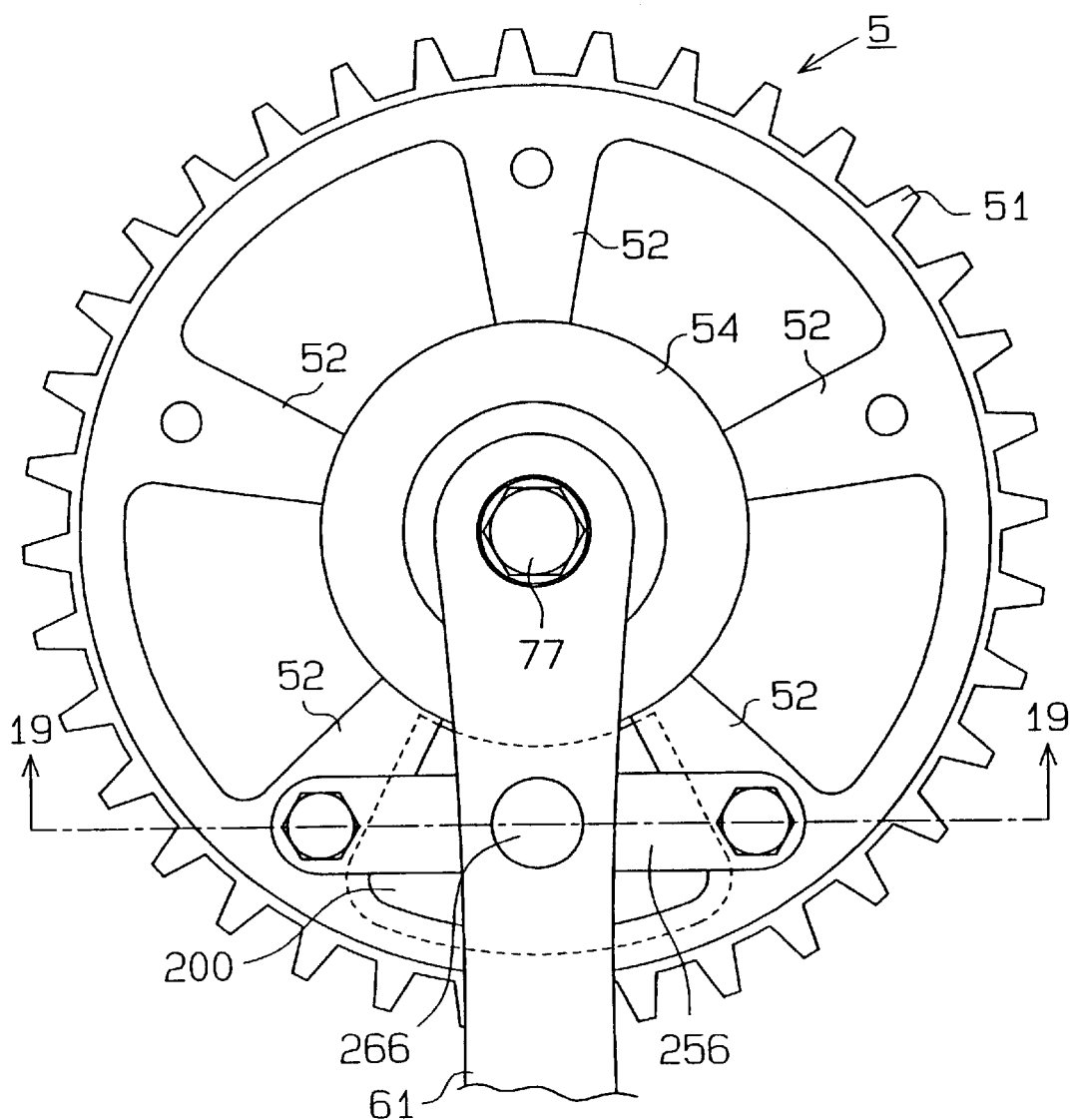
FIG. 18 is a front view showing the structure of a drive gear and a crank arm employed in a fifth embodiment and a sixth embodiment.
Figure 19:
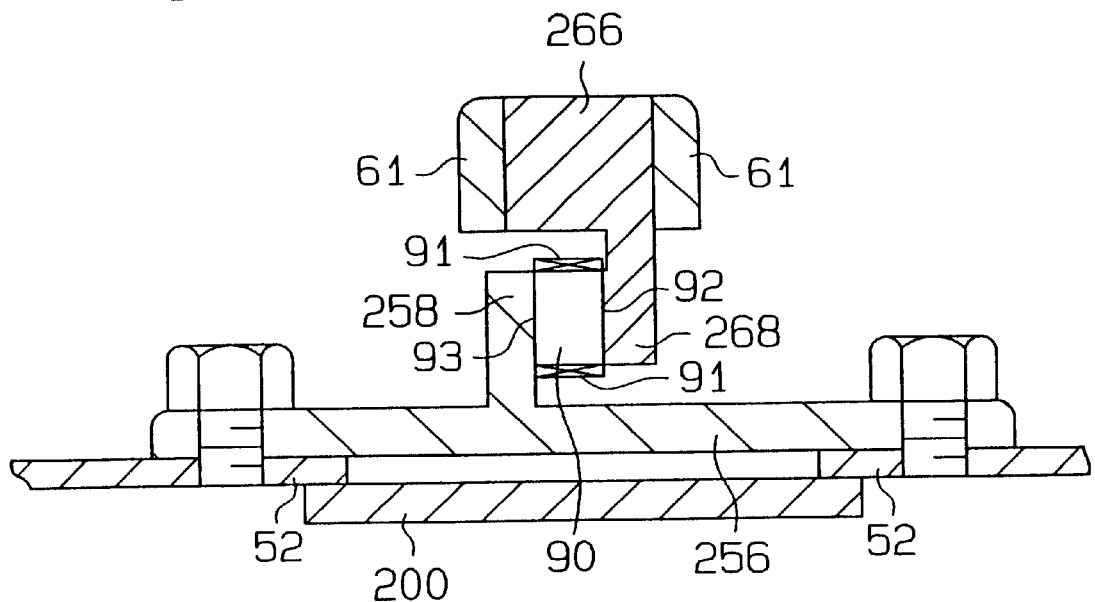
FIG. 19 is an enlarged cross-sectional view taken along line 19—19 in FIG. 18 showing the fifth embodiment.

As shown in FIGS. 18 and 19, a coupling member 256, from which a receiving plate 258 projects toward the crank arm 61, is fixed to two adjacent ribs 52 of the drive gear 5. A rod-like coupling member 266, from which a pressing piece 268 projects facing the receiving plate 258 in the rotating direction, is inserted through a bore of the crank arm 61 and thus fixed.

The core 90 has a second end surface 93, which is coupled with and fixed to the receiving plate 258, and a first end surface 93, which is coupled with the pressing piece 268. A coil 91, which is the same as that employed in the second to fourth embodiments, is wound about the peripheral surface of the core 90. The electric circuit structure is the same as that employed in the fourth embodiment.

In this embodiment, the core 90 is arranged in the space between the drive gear 5 and the crank arm 61. Thus, the core 90 is encompassed by the drive gear 5 and the crank arm 61. Accordingly, the rider's feet, flying pebbles, or the like, do not hit and/or damage the core 90.

Since the pressing piece 268 is coupled to the crank arm 61, a support plate 166, such as that employed in the second embodiment and shown in FIG. 10, need not be employed.

In this embodiment, the core 90 is arranged in the space between the drive gear 5 and the crank arm 61. However, the rotated circuit 200 may further be arranged in the space between the drive gear 5 and the crank arm 61.

Furthermore, in this embodiment, the pressing piece 268 and the receiving plate 258 and the associated end surfaces 92, 93 of the core 90 are directly connected to each other. However, an elastic plate made of rubber or the like may be arranged between the pressing piece 268 and the first end surface 92 of the core 90 or between the receiving plate 258 and the second end surface 93 of the core 90. This would obtain the desirable parallelism between the pressing surface of the pressing piece 268 and the first end surface 92 of the core 90 or between the receiving surface of the receiving plate 258 and the second end surface 93 of the core 90.

SIXTH EMBODIMENT

In this embodiment, a further pressing mode of the core 90, which is made of a magnetostrictive material, is employed. Parts that are identical to that employed in the fifth embodiment will not be described.

Figure 20:
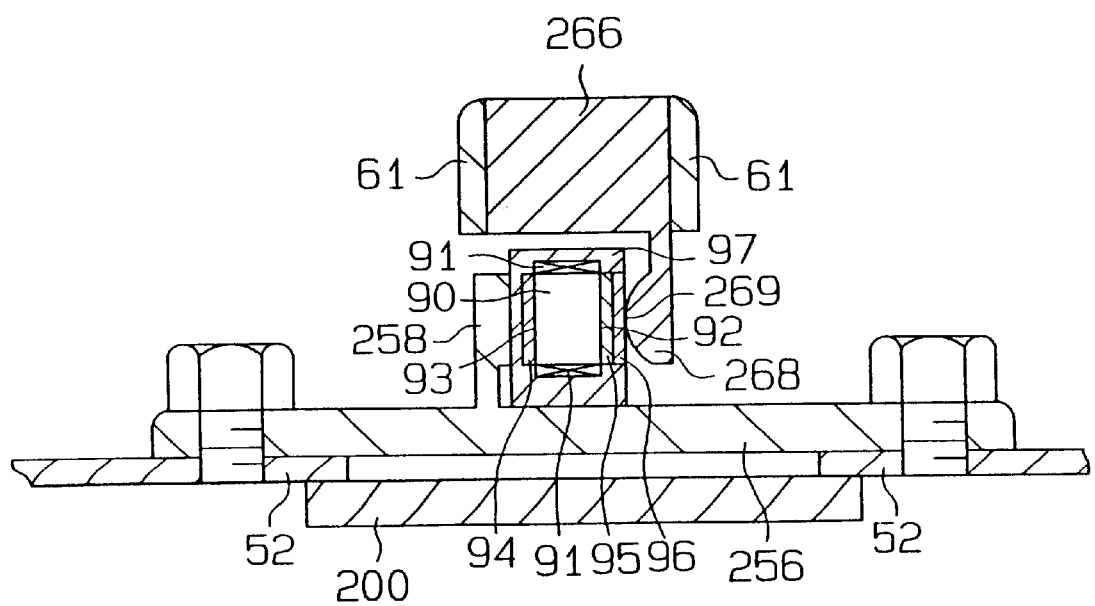
FIG. 20 is an enlarged cross-sectional view corresponding to FIG. 19 showing the sixth embodiment.

Referring to FIG. 20, the core 90 is located in a cuplike container 97, which is a magnetic body, with a coil 91 wound thereabout. The coil 91 is surrounded by the walls of the container 97. The core 90 has a first end surface 92 facing an opening of the container 97. A second end surface 93 faces the bottom inner surface of the container 97 and is thus covered by the surface.

A rubber plate 94, which serves as an elastic plate, is arranged between the second end surface 93 of the core 90 and the bottom inner surface of the container 97. A metal plate 96, which serves as a plate member, is attached to the first end surface 92 with a rubber plate 95, which serves as an elastic plate, arranged in between. The shape and dimension of the rubber plates 94, 95 and the metal plate 96 are substantially the same as the end surfaces 92, 93 of the core 90.

The bottom outer surface of the container 97 is fixed to the receiving plate 258 on the coupling member 256 of the drive gear 5 and arranged such that the metal plate 96 abuts against a round pressing surface 269 of the pressing piece 268.

In this structure, when force is applied to the crank arm 61, the round pressing surface 269 causes the pressing piece 268 to apply force on the metal plate 96 at a single point. Thus, a uniform force is applied to the entire first end surface 92 of the core 90 by way of the rubber plate 95. This prevents erroneous detection caused by biased abutment and local fatigue or damage of the core 90.

The rubber plate 94 arranged between the receiving plate 258 and the core 90 prevents biased abutment between the receiving plate 258 and the core 90. The core 90 and the container 97, which accommodates the receiving plate 258, are made of magnetic bodies. Thus, leakage flux from the core 91 is decreased. This improves detecting sensitivity.

In this embodiment, the pressing surface 269 of the pressing piece 268 is round. However, the receiving plate 258 can be provided with a round pressure receiving surface with the pressing piece 268 having a flat pressing surface 269. In this case, the bottom outer surface of the container 97 is fixed to the pressing piece 268 on the coupling member of the drive gear 5 and arranged such that the metal plate 96 abuts against the round abutting surface of the receiving plate 258.

In this embodiment, the rubber plates 94, 95 are employed as elastic plates. However, the material of the elastic plates is not limited to rubber. Materials having elasticity such as synthetic resin may be employed instead as the elastic plates.

In this embodiment, the metal plate 96 is employed as the plate member. However, the material of the plate member need not be limited to metal as long as the plate member does not deform greatly and break due to the force applied to the pressing piece 268 or the receiving plate 258 when the pedals 62 are turned. Furthermore, if the plate member is magnetic, the plate member and the container 97 eliminate leakage flux from the coil 91 and improve detection sensitivity.

SEVENTH EMBODIMENT

In this embodiment, a further mode for the installation of the rotary coil 201 and the fixed coil 101 is employed.

Figure 21:
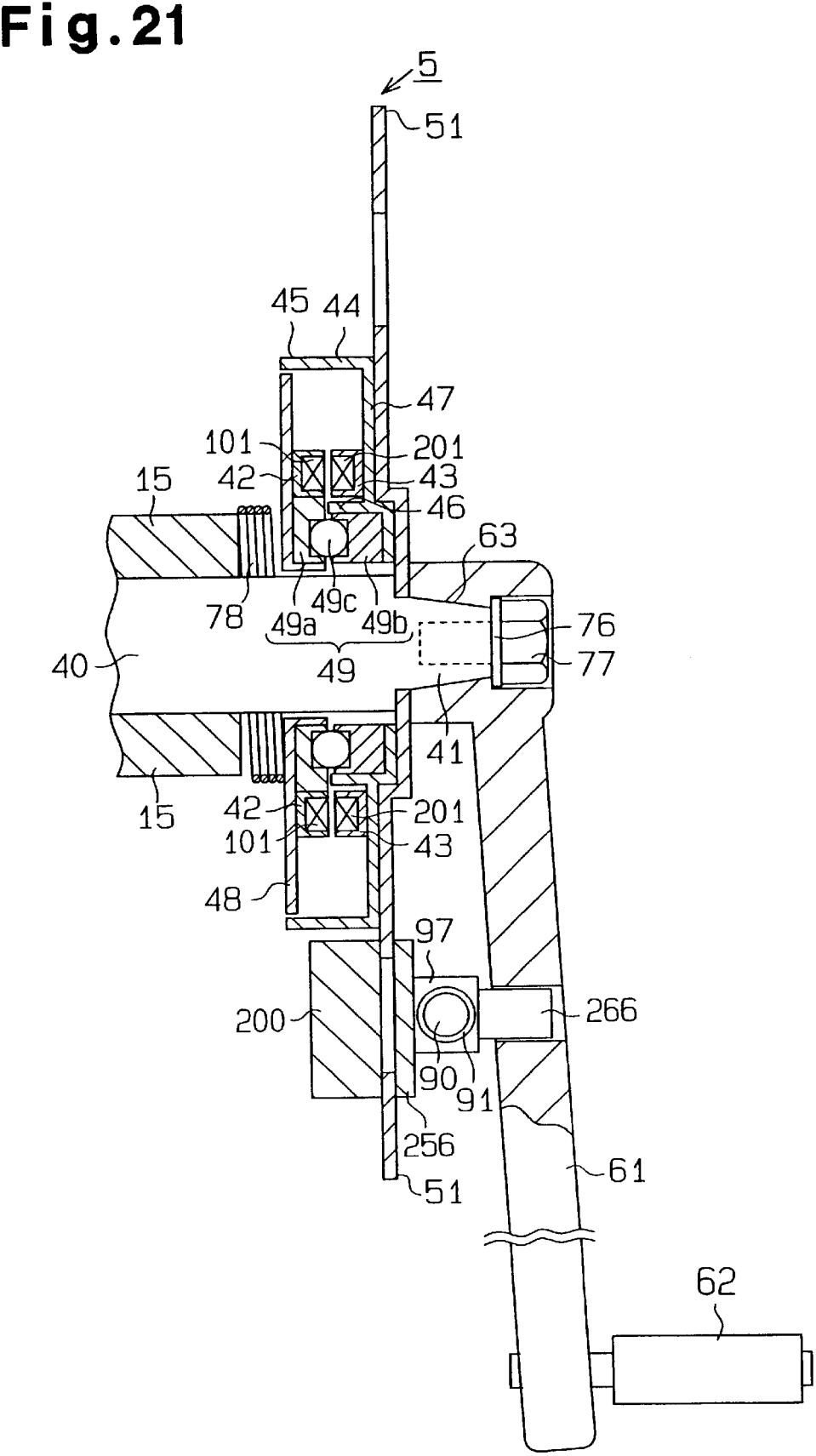
FIG. 21 is a cross-sectional view of a pedal structure employed in the seventh embodiment.

As shown in FIG. 21, an annular cap 48, which serves as a support plate, is coupled to the crank axle 40 at the right side of the bottom bracket 15 with a coil spring 78, which serves as an urging means, arranged between the crank axle 40 and the cup 48. The annular cap 48 is movable in the axial direction of the crank axle 40. Furthermore, the cap 48 is supported by the bottom bracket 15 by a coupling means, such as a bracket (not shown), so that the cap 48 remains fixed at a certain position even if the crank axle 40 is rotated.

One end of the coil spring 78 is fixed to the bottom bracket 15, while the other end is fixed to the left surface of the cap 48 to prevent the coil spring 78 from following the rotation of the drive gear 5. Accordingly, the urging force of the coil spring 78 constantly urges the cap 48 toward the drive gear 5.

A bearing race 49a and a ring core 42 having a U-shaped cross-section are coaxially fixed to the right surface of the cap 48. The ring core 42 has a U-shaped cross-section with an opening facing the drive gear 5. The fixed coil 101 is wound in the opening along the rotating direction of the drive gear 5.

A case 44 is fixed to the left surface of the drive gear 5. The case 44 includes a donut-like bottom portion 47, an annular outer wall portion 45, which projects toward the cap 48 along the periphery of the bottom portion 47, and an annular inner wall portion 46, which projects toward the cap 48 at a location inward from the outer wall portion 45.

A bearing race 49b is fixed to the inner side of the inner wall portion 46. A plurality of balls 49c are held between the two bearing races 49a, 49b. The bearing races 49a, 49b and the balls 49c form a thrust bearing 49, which serves as a spacer and a ball bearing. A ring core 43 having a U-shaped cross-section is fixed to the bottom portion 47 facing the ring core 42, which is fixed to the cap 48. The ring core 43 has an opening in which the rotary coil 201 is wound along the rotating direction of the drive gear 5.

In this embodiment, the cap 48, in which the fixed coil 101 is arranged, is constantly urged toward the rotary coil 201. This maintains a constant distance between the fixed coil 101 and the rotary coil 201 regardless of swinging or vibrations. Accordingly, the reliability and measuring accuracy of the measured torque signals is enhanced.

In this embodiment, the thrust bearing 49 is arranged between the cap 48, which holds the fixed coil 101, and the case 44, which holds the rotary coil 201. Thus, the rotary coil 201, which is arranged in the case 44, keeps rotating smoothly regardless of the cap 48 being urged toward the drive gear 5 by the coil spring 78.

Furthermore, the expansion and contraction of the coil spring 78 and the existence of the thrust bearing 49 maintain a constant distance between the fixed coil 42 and the rotary coil 43 even if the length of the crank axle 40 projecting from the bottom bracket 15 differs due to dimensional differences that occur during production or due to application to a different type of bicycle. Accordingly, the structure related to the coils 42, 43 need not be designed for each bicycle type to keep a constant distance between the coils 42, 43. Furthermore, burdensome processes such as fine adjustment of the distance between the coils 42, 43 need not be performed.

Additionally, this embodiment prevents the infiltration of mud and dust into the case 44.

In this embodiment, the coil spring 78 is employed as the urging means. However, a leaf spring, rubber, or the like may be employed as the urging means.

Figure 22:
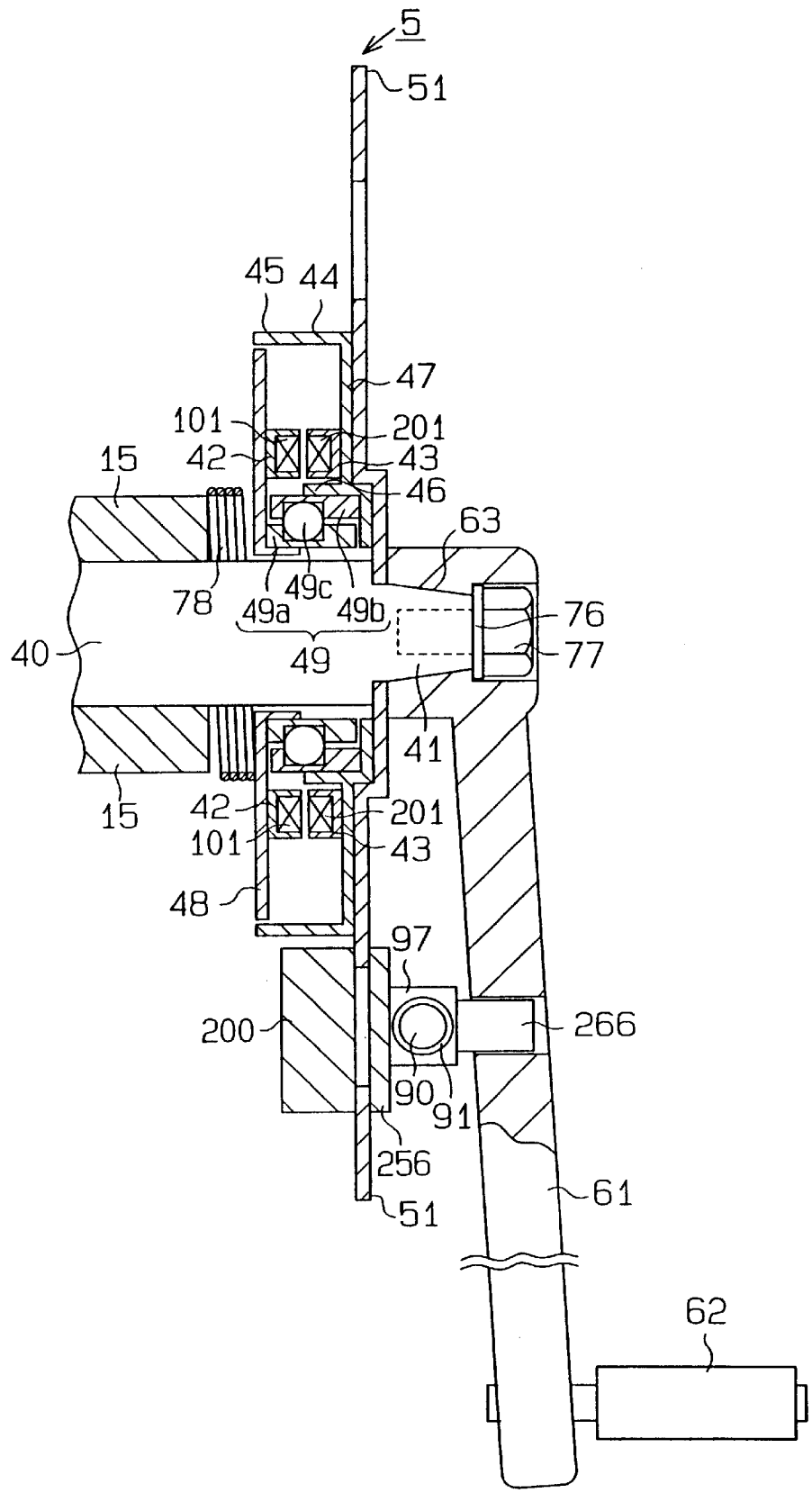
FIG. 22 is a cross-sectional view showing another pedal structure that may be employed in the seventh embodiment.

In this embodiment, the thrust bearing 49 is employed as the spacer and the ball bearing. However, as shown in FIG. 22, a radial bearing 149 may be employed instead. In this case, a bearing race 149a is fixed to the cap 48, a bearing race 149b is fixed to the inner side of the inner wall portion 46 of the case 44, and balls 149c are held between the two races 149a, 149b in the same manner as the thrust bearing 49.

In this embodiment, the bearing race 49b and the ring core 43 may be directly coupled with the drive gear 5.

In the first to seventh embodiments, the present invention is applied to a two wheel bicycle, which drive wheel is the rear wheel 17. However, the present invention may be applied to a front wheel drive bicycle or other types of manpowered vehicles.

In the first to seventh embodiments, the torque applied in the rotating direction of the drive gear 5 and the crank axle 40 is detected. However, the torque applied in the rotating direction of the driven gear 73 and the axle 72 may be detected.

In the first to seventh embodiments, the rear wheel 17, which is the drive wheel, is driven by the drive force produced by manpower and the drive force produced by an auxiliary power apparatus. However, the drive force produced by manpower and the drive force produced by an auxiliary power apparatus may be supplied to two different wheels. For example, in a two wheel bicycle, the rear wheel may be the manpower drive wheel and the front wheel may be the power apparatus drive wheel.

What is claimed is:

1. A manpowered vehicle equipped with an auxiliary power apparatus having a power source for supplementing the driving of the vehicle, comprising:

a main body;

a rotated body supported by the main body and driven by manpower, wherein the rotated body includes,
a crank axle pivotally supported by the main body, a drive gear rotatably coupled to the crank axle, and
a crank arm having a basal end attached to the crank axle and a distal end on which a pedal is arranged to rotate the crank arm integrally with the crank axle, wherein the drive gear is connected to a manpowered drive wheel;

a rotary coil arranged coaxially with the rotated body;

a variable impedance means electrically connected to the rotary coil and having an impedance that varies with the load applied to the rotated body, wherein the variable impedance means includes a core made of a magnetostrictive material and a coil arranged on one part of an outer surface of the core, wherein a remaining part of the outer surface of the core is supported between the crank axle and the drive gear, and the impedance of the coil varies by deformation of the core that corresponds to the load acting on the drive gear;

a fixed coil fixed to the main body such that the fixed coil is concentric with and spaced by a predetermined distance from the rotary coil, wherein the fixed coil is electromagnetically coupled with the rotary coil;

a detector, connected with the fixed coil, that detects changes in electric current or voltage of the fixed coil caused by the rotary coil in accordance with the impedance varied by the variable impedance means, and generating a corresponding output value; and a control means for controlling the power source based on the output value of the detecting means.

2. The manpowered vehicle of claim 1, further comprising:

a power source circuit for supplying electric power in a cyclic manner to the fixed coil, wherein the supply of electric power generates induced electromotive force in the rotary coil.

3. The manpowered vehicle according to claim 2, wherein the auxiliary power apparatus operates by using the induced electromotive force generated by the rotary coil as an electric power source.

4. The manpowered vehicle of claim 3, wherein the oscillating means is connected to the rotary coil and the frequency of signals supplied to the fixed coil by the oscillating means via the rotary coil differs from the frequency of the electric power supplied to the rotary coil by the power source circuit via the fixed coil.

5. The manpowered vehicle of claim 3, wherein the timing of signals supplied to the fixed coil by the oscillating means via the rotary coil differs from the timing of the electric power supplied to the rotary coil by the power source circuit via the fixed coil.

6. The manpowered vehicle according to claim 1, wherein
the crank arm includes a pressing piece that projects toward the drive gear, and the drive gear includes a receiving piece facing the pressing piece along the rotating direction; and
the core is arranged between the pressing piece and the receiving piece.

7. The manpowered vehicle according to claim 1, wherein the detector measures an amplitude of the electric current flowing through the fixed coil or the intensity of the voltage.

8. The manpowered vehicle according to claim 1, wherein the auxiliary power apparatus includes an oscillating means that varies the oscillating frequency in accordance with the impedance varied by the variable impedance means.

9. The manpowered vehicle according to claim 8, wherein the oscillating means is connected to one of the fixed coil and the rotory coil.

10. A manpowered vehicle equipped with an auxiliary power apparatus having a power source for supplementing driving of the vehicle, comprising:
a main body;
a rotated body supported by the main body;
a rotary coil arranged coaxially with the rotated body;
a variable impedance electrically connected to the rotary coil and having an impedance that varies with the load applied to the rotated body, the variable impedance including a core made of a magnetostrictive material and a coil arranged on one part of an outer surface of the core, wherein the remaining part of the outer surface of the core is supported between the crank axle and the drive gear, and the impedance of the coil is varied by deformation of the core that corresponds to the load acting on the drive gear;
a fixed coil attached to the main body such that the fixed coil is concentric with and spaced from the rotary coil, wherein the fixed coil is electromagnetically coupled with the rotary coil;
a detector, connected with the fixed coil, that detects changes in at least one of electric current and voltage of the fixed coil caused by the rotary coil in accordance with the impedance varied by the variable impedance and generating a corresponding output value; and
a control means for controlling the power source based on the output value of the detecting means.

11. The manpowered vehicle according to claim 10, wherein the crank arm includes a pressing piece that projects toward the drive gear, and the drive gear includes a receiving piece facing the pressing piece along the rotating direction, and wherein the core is arranged between the pressing piece and the receiving piece.

12. A manpowered vehicle equipped with an auxiliary power apparatus having a power source for supplementing the driving of the vehicle, comprising:
a main body;
a crank axle pivotally supported by the main body;
a drive gear rotatable coupled to the crank axle;
a crank arm attached to the crank axle, wherein a load exerted on the crank arm by manpower is used to rotate the crank axle and the drive gear;
a pressing piece attached to the crank arm and projecting towards the drive gear;
a receiving piece attached to the drive gear and facing the pressing piece;
a rotary coil arranged coaxially with the rotated body;
a variable impedance electrically connected to the rotary coil and having an impedance that varies with the load applied to the rotated body, the variable impedance including a core made of a magnetostrictive material and a core coil arranged on an outer surface of the core, wherein the core is arranged between the pressing piece and the receiving piece and the impedance of the core coil is varied by deformation of the core that corresponds to the load acting on the drive gear;
a fixed coil attached to the main body such that the fixed coil is concentric with and spaced by a predetermined distance from the rotary coil, wherein the fixed coil is electromagnetically coupled with the rotary coil;
a detector, connected with the fixed coil, that detects changes in electrical current or voltage of the fixed coil caused by the rotary coil in accordance with the impedance varied by the variable impedance, and generating a corresponding output value; and
a controller for controlling the power source based on the output value of the detecting means.

* * * * *